(12) United States Patent
Hiroki

(10) Patent No.: US 10,911,589 B2
(45) Date of Patent: Feb. 2, 2021

(54) VEHICLE CONTROL DEVICE

(71) Applicant: TOYOTA JIDOSHA KABUSHIKI KAISHA, Toyota (JP)

(72) Inventor: Daisuke Hiroki, Toda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 15/804,490

(22) Filed: Nov. 6, 2017

(65) Prior Publication Data

US 2018/0159970 A1    Jun. 7, 2018

(30) Foreign Application Priority Data

Dec. 2, 2016    (JP) .................................. 2016-234923

(51) Int. Cl.
- *H04M 1/60* (2006.01)
- *B60R 16/037* (2006.01)
- *H04M 1/725* (2006.01)

(52) U.S. Cl.
CPC ....... *H04M 1/6083* (2013.01); *B60R 16/0373* (2013.01); *H04M 1/72597* (2013.01)

(58) Field of Classification Search
CPC ........... B60W 2050/0062–66; B60W 2050/78; B60W 2050/95; B60W 2050/96
See application file for complete search history.

(56) References Cited

U.S. PATENT DOCUMENTS

| | | | |
|---|---|---|---|
| 2004/0203918 A1* | 10/2004 | Moriguchi | G01C 21/26 455/456.1 |
| 2005/0021190 A1* | 1/2005 | Worrell | B60K 35/00 701/1 |
| 2007/0273492 A1 | 11/2007 | Hara et al. | |
| 2008/0015863 A1* | 1/2008 | Agapi | G10L 15/22 704/275 |
| 2011/0238289 A1* | 9/2011 | Lehmann | G01C 21/3438 701/533 |
| 2014/0052681 A1* | 2/2014 | Nitz | H04L 51/02 706/46 |
| 2014/0303839 A1* | 10/2014 | Filev | G06F 3/0481 701/36 |

(Continued)

FOREIGN PATENT DOCUMENTS

| | | |
|---|---|---|
| JP | 2000011266 A | 1/2000 |
| JP | 2002258892 A | 9/2002 |

(Continued)

*Primary Examiner* — Wen W Huang
(74) *Attorney, Agent, or Firm* — Hunton Andrews Kurth LLP

(57) ABSTRACT

A vehicle control device includes an electronic control unit. The electronic control unit is configured to execute a command switching process according to the prediction node. In a transition prediction process, a node of the data for prediction corresponding to a current node of a vehicle is set to a start point node based on data for prediction, and at least one of candidate nodes is set to a prediction node specifying a future state of the vehicle. The electronic control unit is configured to execute a command generation process of generating a command for controlling the devices in the vehicle based on a correspondence relationship according to an input operation performed to the input device.

12 Claims, 14 Drawing Sheets

(56) References Cited

U.S. PATENT DOCUMENTS

| | | | |
|---|---|---|---|
| 2015/0112919 A1* | 4/2015 | Weir | G01C 21/3476 706/52 |
| 2016/0050315 A1* | 2/2016 | Malhotra | G07C 5/008 455/414.1 |
| 2016/0303968 A1* | 10/2016 | Miller | B60K 35/00 |
| 2018/0257668 A1* | 9/2018 | Tonshal | H04W 4/023 |
| 2018/0273050 A1* | 9/2018 | Tertoolen | B60R 1/00 |
| 2019/0017840 A1* | 1/2019 | Okamoto | G01C 21/3629 |

FOREIGN PATENT DOCUMENTS

| | | | |
|---|---|---|---|
| JP | 2006069309 A | | 3/2006 |
| JP | 2007062559 A | | 3/2007 |
| JP | 2007230422 A | | 9/2007 |
| JP | 2016-095707 A | | 5/2016 |

* cited by examiner

| NODE ID | VEHICLE DATA GROUP | | | NUMBER OF OBSERVATIONS |
|---|---|---|---|---|
| | DATA 1 | ... | DATA M | |
| 1 | a11 | ... | a1M | x |
| ... | ... | ... | ... | ... |
| N | aN1 | ... | aNM | y |

| LINK ID | START POINT NODE ID | END POINT NODE ID | NUMBER OF OBSERVATIONS |
|---|---|---|---|
| 1 | N1 | N2 | p |
| ... | ... | ... | ... |
| M | Ni | Nj | q |

FIG. 11A

| NODE ID | VEHICLE DATA GROUP | | | NUMBER OF OBSERVATIONS | CUMULATIVE OBSERVATION TIME |
|---|---|---|---|---|---|
| | DATA 1 | ... | DATA M | | |
| 1 | a11 | ... | a1M | x | |
| ... | ... | ... | ... | ... | |
| N | aN1 | ... | aNM | y | |

FIG. 11B

| LINK ID | START POINT NODE ID | END POINT NODE ID | NUMBER OF OBSERVATIONS |
|---|---|---|---|
| 1 | N1 | N2 | p |
| ... | ... | ... | ... |
| M | Ni | Nj | q |

VEHICLE CONTROL DEVICE

INCORPORATION BY REFERENCE

The disclosure of Japanese Patent Application No. 2016-234923 filed on Dec. 2, 2016 including the specification, drawings and abstract is incorporated herein by reference in its entirety.

BACKGROUND

1. Technical Field

The present disclosure relates to a vehicle control device that controls a plurality of types of devices in a vehicle according to an input operation to an input device in which an instruction is performed from a user to the vehicle.

2. Description of Related Art

For example, Japanese Unexamined Patent Application Publication No. 2016-95707 (JP 2016-95707 A) describes a transition prediction device (vehicle control device) that predicts a driving scene of a vehicle using a directed graph. Here, the directed graph is data in which driving symbols (nodes) are defined based on vehicle data groups acquired in the same period of time, and a link is defined by a transition of the node among pieces of time-series data generated by sequentially acquiring vehicle data groups that are a plurality of types of data regarding devices in the vehicle. The control device predicts a node that is a transition destination from a current node using the directed graph, and performs a warning when the node corresponds to a dangerous driving scene (paragraph "0018").

SUMMARY

Incidentally, even when a warning is performed to instruct a user to perform an appropriate operation according to prediction, the user is likely to perform an erroneous operation or to feel that performing the appropriate operation is complicated, for example, in a case where an appropriate input operation is a complicated operation.

The present disclosure provides a vehicle control device that supports a user appropriately instructing control of a device through a simple input operation performed to an input device.

In an aspect of the present disclosure, a vehicle control device that controls a plurality of types of devices in a vehicle according to an input operation performed to an input device in which an instruction to the vehicle is performed by a user includes an electronic control unit. The electronic control unit is configured to execute a transition prediction process of predicting at least one of candidate nodes as a prediction node specifying a future state, the candidate nodes being reached through one or a plurality of transitions defined by a link and having a starting point that is a node of data for prediction corresponding to a current node of the vehicle, the starting point node being set based on data for prediction in which the link of a directed graph is defined by the transition of a node, the directed graph being defined based on a data group that is a plurality of types of data including data regarding the device that is controlled according to the input operation performed to the input device, the data group being acquired in the same period of time; execute a command switching process of switching a correspondence relationship between the input operation performed to the input device and a type of process of controlling the device in the vehicle according to the prediction node predicted through the transition prediction process; and execute a command generation process of generating a command for controlling the devices in the vehicle based on the correspondence relationship according to the input operation performed to the input device.

According to an aspect of the present disclosure, by a user performing an input operation with respect to the input device in order to switch the correspondence relationship between the input operation performed to the input device and the type of process of controlling the device according to the prediction node, an appropriate command is generated and a predetermined device is controlled as a control of the predetermined device in view of the prediction node. Therefore, it is possible to suppress a situation in which control different from a user's intention through the input operation is performed. Further, it is possible to support the user appropriately instructing control of the device through a simple input operation performed to the input device.

In an aspect of the present disclosure, the device in the vehicle may include a response device that is configured to perform an incoming call response of a phone. The command switching process may include a process of associating an incoming call response of the response device with the input operation performed to the input device on condition that the prediction node is a node representing the incoming call response of the phone.

When there is an incoming call of a phone during driving of the vehicle, it is difficult for attention resources to be allocated to an incoming call response since it is needed for the user to concentrate on driving. Therefore, according to the aspect of the present disclosure, the input operation performed to the input device is associated with the incoming call response of the response device such that the user can instruct the incoming call response through a simple operation.

In an aspect of the present disclosure, the input device may include a steering switch that is a switch provided on a steering of the vehicle. The command switching process may include a process of associating the incoming call response of the response device with an input operation performed to the steering switch on condition that the prediction node is a node representing the incoming call response of the phone.

According to an aspect of the present disclosure, the user can simply instruct the incoming call response during driving of the vehicle by associating the input operation performed to the steering switch with the incoming call response of the response device.

In an aspect of the present disclosure, the input device may include a voice sensing device. The electronic control unit may be configured to execute a voice specifying process of specifying voice input to the voice sensing device based on an output of the voice sensing device. The command generation process may include a process of generating a command for controlling any one of the plurality of types of devices based on a correspondence relationship between the voice specified through the voice specifying process and control of the plurality of types of devices in the vehicle. The command switching process may include a process of changing the device that is associated with the voice by the correspondence relationship based on the prediction node.

For example, increasing a temperature of an air conditioning device and increasing a volume of an audio may be associated with terms such as "increase" and "UP". It is difficult to accurately identify increasing the temperature of the air conditioning device and increasing the volume of the audio, whereas it is easy for the user to utter a word such as "increase" as compared with uttering voice such as "increase a set temperature of the air conditioning device". Therefore, according to the aspect of the present disclosure, a type of control of a device intended by the user is predicted from an input operation performed to the input device based on the prediction node. Thus, it is possible to simplify a voice input operation requested for the user in order to perform intended control.

In an aspect of the present disclosure, the electronic control unit may be configured to execute an active state switching process of causing the voice specifying process to enter an active state on condition that the prediction node is a node representing execution of the voice specifying process in an inactive state in which the voice specifying process is not executed.

According to an aspect of the present disclosure, when a request for the voice specifying process is predicted based on the prediction node, it is not needed to issue a command for setting the voice specifying processing to the active state prior to the user using the voice specifying process, by setting the voice specifying process to the active state.

In an aspect of the present disclosure, the input device may include an image sensing device that senses an image in the vehicle. The electronic control unit may be configured to execute an operation specifying process of specifying an operation of the user based on an output of the image sensing device. The command generation process may include a process of generating a command for controlling any one of the plurality of types of devices based on a correspondence relationship between the operation specified by the operation specifying process and the control of the plurality of types of devices in the vehicle. The command switching process may include a process of changing the device that is associated with the operation according to the correspondence relationship based on the prediction node.

According to an aspect of the present disclosure, since the type of control of the device intended by the user is predicted based on the prediction node, it is possible to suppress a situation in which control different from that intended by an operation of the user is performed, unlike a case where the type of control is not predicted.

In an aspect of the present disclosure, the electronic control unit may be configured to execute an active state switching process of causing the operation specifying process to enter an active state on condition that the prediction node is a node representing execution of the operation specifying process in an inactive state in which the operation specifying process based on the output of the image sensing device is not executed.

According to an aspect of the present disclosure, when the operation specifying process is predicted to be required based on the prediction node, it is not needed to issue a command for setting the operation specifying processing to the active state prior to the user using the operation specifying process, by setting the operation specifying process to the active state.

In an aspect of the present disclosure, the vehicle may include an image display device. The input device may include a touch panel overlapping the image display device. The electronic control unit may be configured to execute a display switching process of changing an image displayed on the image display device based on the prediction node. The command generation process may include a process of controlling any one of the plurality of types of devices based on a correspondence relationship between a specific position on the touch panel and the control of the device in the vehicle. The command switching process may include a process of changing a correspondence relationship between the specific position on the touch panel and a command corresponding to the position based on the prediction node.

According to an aspect of the present disclosure, content indicating that the user desires to make an instruction using a touch panel is predicted based on the prediction node, the image on the image display device is switched, and the command correspondence relationship is switched. Therefore, it is possible to rapidly perform an intended input operation using the touch panel without an effort of the user switching an image or the like on the image display device with the touch panel overlapping thereon.

In an aspect of the present disclosure, the electronic control unit may be configured to execute a correspondence relationship generation process of newly generating the correspondence relationship based on the prediction node. Even when a state in which the control of a certain device is instructed by the prediction node can be predicted, it may be troublesome to undoubtedly perform the operation of the input device for instructing the control of the device. Therefore, according to the aspect of the present disclosure, it is possible to expand the types of devices that are targets of the input operation when the user performs an instruction, by generating a new correspondence relationship.

In an aspect of the present disclosure, the correspondence relationship generation process may include a process of generating a correspondence relationship for associating a process of performing control to change a state of any one of the plurality of types of devices from a state represented by a current node to a state represented by the prediction node with an input operation indicating permission of the user for performing of the process, and the electronic control unit may be configured to execute a guidance recommendation process of guiding or recommending an input operation indicating permission of the user when switching to the correspondence relationship generated through the command switching process is performed.

According to an aspect of the present disclosure, since control to a state represented by the prediction node is executed through an input operation indicating permission of the user, it is possible to simplify the input operation of the user. Further, it is possible to confirm whether the control based on the prediction node is intended by the user.

In an aspect of the present disclosure, a vehicle control device that controls a plurality of types of devices in a vehicle according to an input operation performed to an input device in which an instruction to the vehicle is performed by a user includes an electronic control unit. The electronic control unit is configured to execute a transition prediction process of predicting at least one of candidate nodes as a prediction node specifying a future state. The candidate nodes is reached through one or a plurality of transitions defined by a link and have a starting point node that is a node of data for prediction corresponding to a current node of the vehicle. The starting point node is set based on data for prediction in which the link of a directed graph is defined by the transition of a node. The directed graph is defined based on a data group that is a plurality of types of data including data regarding the device that is controlled according to the input operation performed to the input device, the data group being acquired in the same period of time.

In an aspect of the present disclosure, the data for prediction may include data regarding an average value of a duration of the node, and the electronic control unit may be configured to execute a duration prediction process of predicting a duration of the current node based on the current node and the data regarding the average value, and execute at least one of a permission process of determining whether the duration predicted through the duration prediction process is equal to or longer than a threshold time and permitting execution of the transition prediction process on condition that the duration is equal to or longer than the threshold time, and a limiting process of limiting the number of the candidate nodes when the duration is relatively shorter to a smaller value than that when the duration is relatively longer.

Since it takes a certain amount of time to execute the transition prediction process, the current node is likely to be changed before the command generation process is executed based on the transition prediction process when the duration of the current node is relatively shorter. When the current node is changed, the command generation process based on the prediction node in which a node before the change is a start point node is unlikely to be appropriate. On the other hand, when the execution of the transition prediction process is permitted in a case where the predicted value of the duration of the current node is equal to or greater than the threshold time, it is possible to suppress occurrence of such a situation. Further, according to the limiting process, since a calculation load on the transition prediction process can be reduced when the predicted duration is relatively shorter, the command generation process is highly likely to be completed before the current node is changed, based on rapid prediction.

BRIEF DESCRIPTION OF THE DRAWINGS

Features, ad vantages, and technical and industrial significance of exemplary embodiments of the disclosure will be described below with reference to the accompanying drawings, in which like numerals denote like elements, and wherein:

FIG. 11A is a diagram illustrating a node list according to a fourth embodiment;

FIG. 11B is a diagram illustrating a link list according to the fourth embodiment;

DETAILED DESCRIPTION OF EMBODIMENTS

First Embodiment

Figure 1:
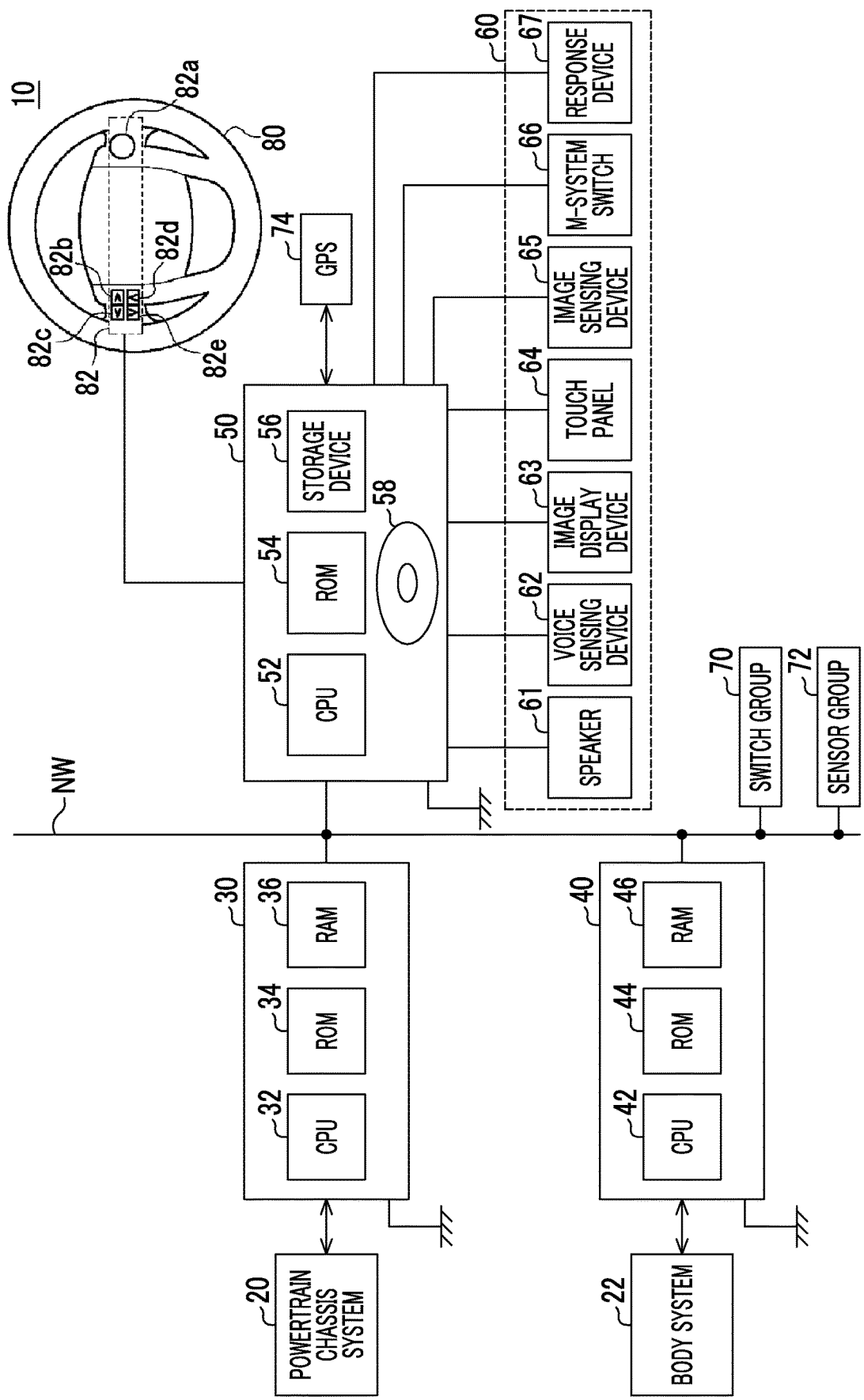
FIG. 1 is a diagram illustrating an electronic device in a vehicle according to a first embodiment.

Hereinafter, a first embodiment of a vehicle control device will be described with reference to the drawings. FIG. 1 illustrates, particularly, some of electronic devices connected by a network NW in the vehicle 10.

A powertrain chassis system 20 includes an in-vehicle main device that applies power to a driving wheel, a transmission, a steering actuator that steers steered wheels, and a brake actuator that applies a braking force to the wheels, some of various sensors that sense a state of the above-described device, and the like. The electronic control unit (ECU 30) sets the powertrain chassis system 20 as a control target. For example, the ECU 30 controls an output of the in-vehicle main device, operates the steering actuator to control a force for steering the steered wheels, or controls a gear ratio of a transmission. The ECU 30 includes a CPU 32, a ROM 34, and a RAM 36.

The body system 22 includes an in-vehicle air conditioning device, a lighting device, a door lock device, an automatic window opening and closing device, an instrument panel, and some of various sensors that sense a state of the above-described device. The electronic control unit (ECU 40) sets the body system 22 as a control target. For example, the ECU 40 operates the in-vehicle air conditioning device according to an instruction from a user to control an indoor temperature. Further, for example, the ECU 40 controls the illuminance, an irradiation direction, and the like of the lighting device according to the instruction of the user. Further, for example, the ECU 40 determines whether the user is an authorized user based on an authenticated terminal carried by the user, and performs control to switch the door lock device to a released state on condition that the user is an authorized user. The ECU 40 includes a CPU 42, a ROM 44, and a RAM 46.

A multimedia system 60 includes a speaker 61 that outputs sound, a voice sensing device 62 that converts vibration caused by the sound into an electrical signal, an image display device 63 such as a liquid crystal display device or an organic EL display device, a touch panel 64 arranged to overlap the image display device 63, and an image sensing device 65 including, for example, a solidstate imaging element or the like to sense an indoor image. Further, the multimedia system 60 includes an M-system switch 66 including a group of switches that receives an input operation of the user with respect to the multimedia system 60 and arranged, for example, around the image display device 63, and a response device 67 that performs wireless communication with a mobile phone to perform a response process to an incoming call directed to the mobile phone.

The electronic control unit (ECU 50) sets the multimedia system 60 as a control target. The ECU 50 includes a CPU 52, a ROM 54, and a storage device 56. In particular, the storage device 56 according to the embodiment is a non-volatile storage device in which stored content (data) can be electrically rewritten, and holds the same data regardless of the presence or absence of supply of power. On the other hand, the RAMs 36, 46 are volatile memories in which data cannot be held when supply of power is stopped.

The ECUs 30, 40, 50 are connected to the network NW. Various switches (a switch group 70) of the vehicle not directly connected to the ECUs 30, 40, 50, or various sensors (a sensor group 72) such as an environmental sound sensor that senses sound outside the vehicle 10 not directly connected to the ECUs 30, 40, 50 are connected to the network NW. In FIG. 1, for convenience of description, the switch group 70 and a steering switch 82 provided in a steering wheel (steering 80) are separately illustrated. The steering switch 82 includes a mode switch 82a provided on the right side of the steering 80, and a right selection switch 82b, a left selection switch 82c, an UP switch 82d, and a DOWN switch 82e provided on the left side of the steering 80.

The vehicle 10 further includes a global positioning system (GPS 74). For example, when radio broadcasting is instructed by operating the M-system switch 66, the ECU 50 executes a radio broadcast reception process and a reception data reproduction process using the speaker 61. Further, when use of the navigation system is instructed by the operation of the M-system switch 66, the ECU 50 extracts map data in the vicinity of a current position from map data stored in a hard disk 58 based on a position of the vehicle 10 sensed by the GPS 74, and displays the map data on the image display device 63.

Further, the ECU 50 recognizes a voice signal of the user as an instruction (input operation) from the user based on an output signal of the voice sensing device 62, or recognizes an operation of the user as an instruction (input operation) from the user based on an output signal of the image sensing device 65. Hereinafter, the above will be described based on FIGS. 2A, 2B and 2C.

Figure 2A:
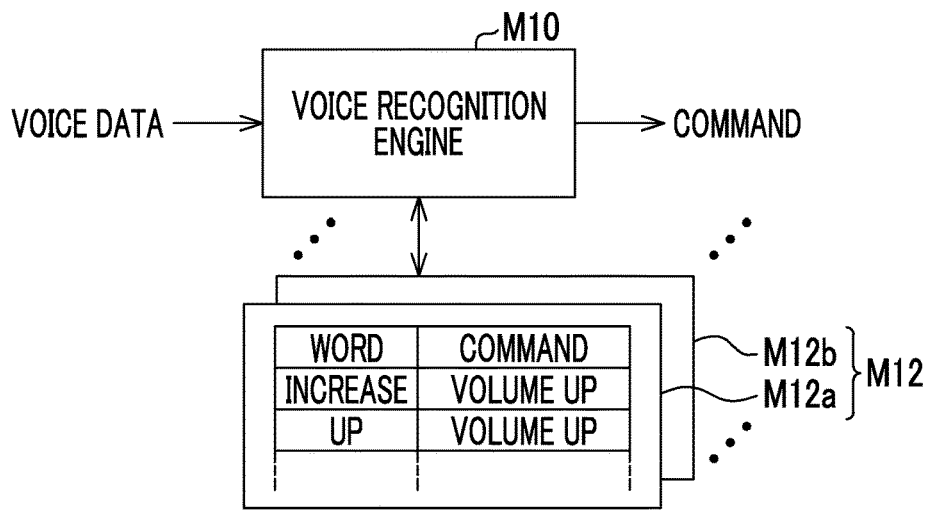
FIG. 2A is a block diagram illustrating a portion of a process of a media-based ECU according to the first embodiment.
Figure 2B:
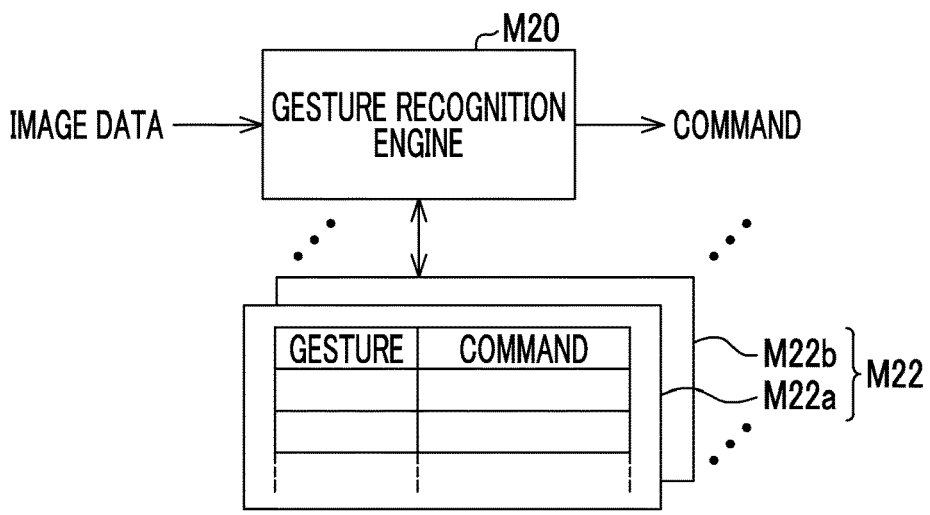
FIG. 2B is a block diagram illustrating a portion of a process of the media-based ECU according to the first embodiment.
Figure 2C:
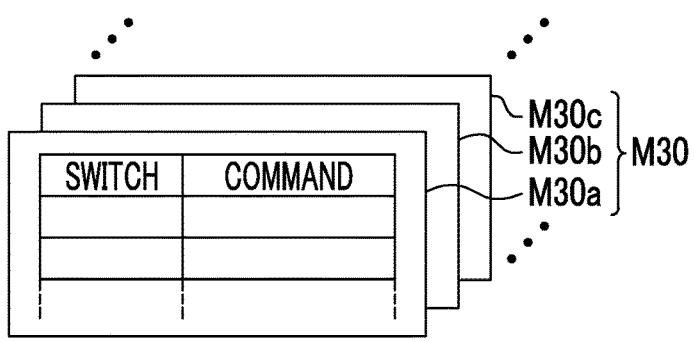
FIG. 2C is a block diagram illustrating a portion of a process of the media-based ECU according to the first embodiment.

FIGS. 2A, 2B, and 2C illustrate some of processes that are realized by the CPU 52 executing a program stored in the ROM 54, and some of pieces of data stored in the ROM 54. FIG. 2A illustrates a voice recognition process. A voice recognition engine M10 receives voice data that is an output signal of a voice sensing device 62, performs association with a word or a sentence defined in a voice recognition dictionary M12, and associates the word or sentence with a command. Here, the voice recognition dictionary M12 includes different dictionaries for respective types of devices that are targets instructed by the user. For example, a voice recognition dictionary M12a relates to an audio function, and a voice recognition dictionary M12b relates to the in-vehicle air conditioning device. FIG. 2A illustrates that "increase" and "UP" are registered as words in the voice recognition dictionary M12a, and both the "increase" and the "UP" correspond to a command to increase a volume. In the embodiment, "increase" and "UP" are also registered as words in the voice recognition dictionary M12b, and both the "increase" and the "UP" correspond to a command to increase a set temperature of the in-vehicle air conditioning device. Thus, in the embodiment, the same word is set to correspond to a plurality of commands.

For example, a sentence such as "Audio volume UP" is also registered in the voice recognition dictionary M12a, and a sentence such as "Increase a temperature" is also registered in the voice recognition dictionary M12b. The M-system switch 66 includes a switch for starting up the voice recognition engine M10, and when the voice recognition engine M10 is started up, both the voice recognition dictionary M12a and the voice recognition dictionary M12b may be candidates of association with voice data. However, in the embodiment, a mode selection switch is included in the M-system switch 66 or the steering switch 82 to be described below, such that a mode to be used for which device is instructed can be designated.

FIG. 2B illustrates a gesture recognition process of recognizing an operation of the user. A gesture recognition engine M20 receives image data that is an output signal of the image sensing device 65, performs association with a gesture defined in a gesture recognition dictionary M22, and performs association with a command associated with the gesture. Here, the gesture recognition dictionary M22 includes different dictionaries for respective types of devices that are targets instructed by the user. For example, a gesture recognition dictionary M22a relates to an audio function, and a gesture recognition dictionary M22b relates to the in-vehicle air conditioning device. For example, in the gesture recognition dictionary M22a, a gesture of raising a hand in a state in which a palm is spread horizontally corresponds to a command to increase the volume. Further, in the gesture recognition dictionary M22b, the same gesture corresponds to a command to increase the set temperature of the in-vehicle air conditioning device. In the embodiment, the M-system switch 66 includes a switch that starts up the gesture recognition engine M 20. Further, in the embodiment, a mode selection switch is included in the M-system switch 66 or the steering switch 82 to be described below, such that a mode to be used for which device to be instructed can be designated.

FIG. 2C illustrates a switch-command correspondence table M30 which defines a command associated with an operation of the steering switch 82. Here, a switch-command correspondence table M30a defines a mode that is selected according to an operation of the mode switch 82a. That is, for example, switching to "voice data reproduction process"→"voice data list display"→"radio playback"→"radio tuning"→"television broadcasting playback"→"television broadcast tuning"→"map data display"→"air conditioning device operation"→"selection of availability of an incoming call response of a phone" each time the mode switch 82a is pressed is defined. Further, a process corresponding to an operation of each of the right selection switch 82b, the left selection switch 82c, the UP switch 82d, and the DOWN switch 82e when a mode of a "voice data reproduction process" is selected is defined in a switch-command correspondence table M30b. That is, for example, a process of stopping reproduction of a currently reproduced song and reproducing the next song is defined in the operation of the right selection switch 82b, and a process of stopping reproduction of a currently reproduced song and reproducing an immediately previous song is defined in the operation of the left selection switch 82c. Further, for example, a process of increasing the volume is defined in the operation of the UP switch 82d, and a process of decreasing the volume is defined in the operation of the DOWN switch 82e. Further, a process corresponding to an operation of each of the right selection switch 82b, the left selection switch 82c, the UP switch 82d, and the DOWN switch 82e when a mode of "selection of availability of an incoming call response of a phone" is selected is defined in a switch-command correspondence table M30c. That is, for example, a process of responding to an incoming call using the response device 67 is defined in the operation of the right selection switch 82b, the left selection switch 82c, the UP switch 82d, and the DOWN switch 82e. Further, a process of not responding to the incoming call response of the phone and transmitting a voice guidance to a partner to indicate that the phone is not currently responded is defined in a long pressing operation of the mode switch 82a.

The ECU 50 further executes a transition prediction process of predicting a future state of the vehicle using a directed graph, and a process of controlling various devices in the vehicle 10 according to a transition prediction process. Hereinafter, the process will be described in detail.

Figures 3, 4A, 4B:
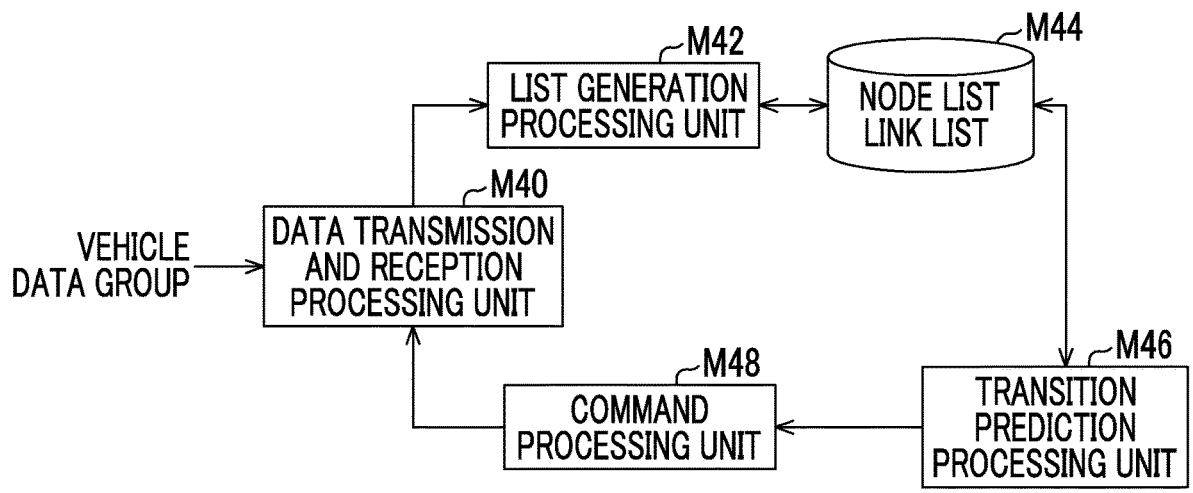
FIG. 3 is a block diagram illustrating a portion of a process according to the first embodiment.
FIG. 4A is a diagram illustrating a node list according to the first embodiment.
FIG. 4B is a diagram illustrating a link list according to the first embodiment.

FIG. 3 illustrates a process of generating the directed graph, a transition prediction process, and a process of controlling various devices. The process is realized by the CPU 52 executing a program stored in the ROM 54.

A data transmission and reception processing unit M40 performs transmission and reception of data to and from the outside of the ECU 50. A list generation processing unit M42 performs a process of generating a node list and a link list of the directed graph illustrated in FIGS. 4A and 4B.

FIG. 4A illustrates the node list. The node list is data in which a node ID is assigned to a node that is specified by a vehicle data group that is a plurality of types of pieces of data regarding devices in the vehicle, and the number of observations of the nodes has been recorded. FIG. 4B illustrates the link list. The link defines a transition from one node to the other node in a pair of nodes registered in the node list. The link list is data in which a node ID before the transition is defined as a start point node ID, a node ID after the transition is defined as an end point node ID, and the number of observations of the links has been recorded.

FIG. 3 illustrates various processes, and a node list and link list M44 for convenience of description. In fact, the node list or the link list is stored in the storage device 56.

A transition prediction processing unit M46 specifies a current node from the vehicle data group, and predicts a node to which a transition will occur in future using the link list. A command processing unit M48 generates a command to control the device in the vehicle 10 based on the node predicted by the transition prediction processing unit M46, and controls the device.

Figure 5:
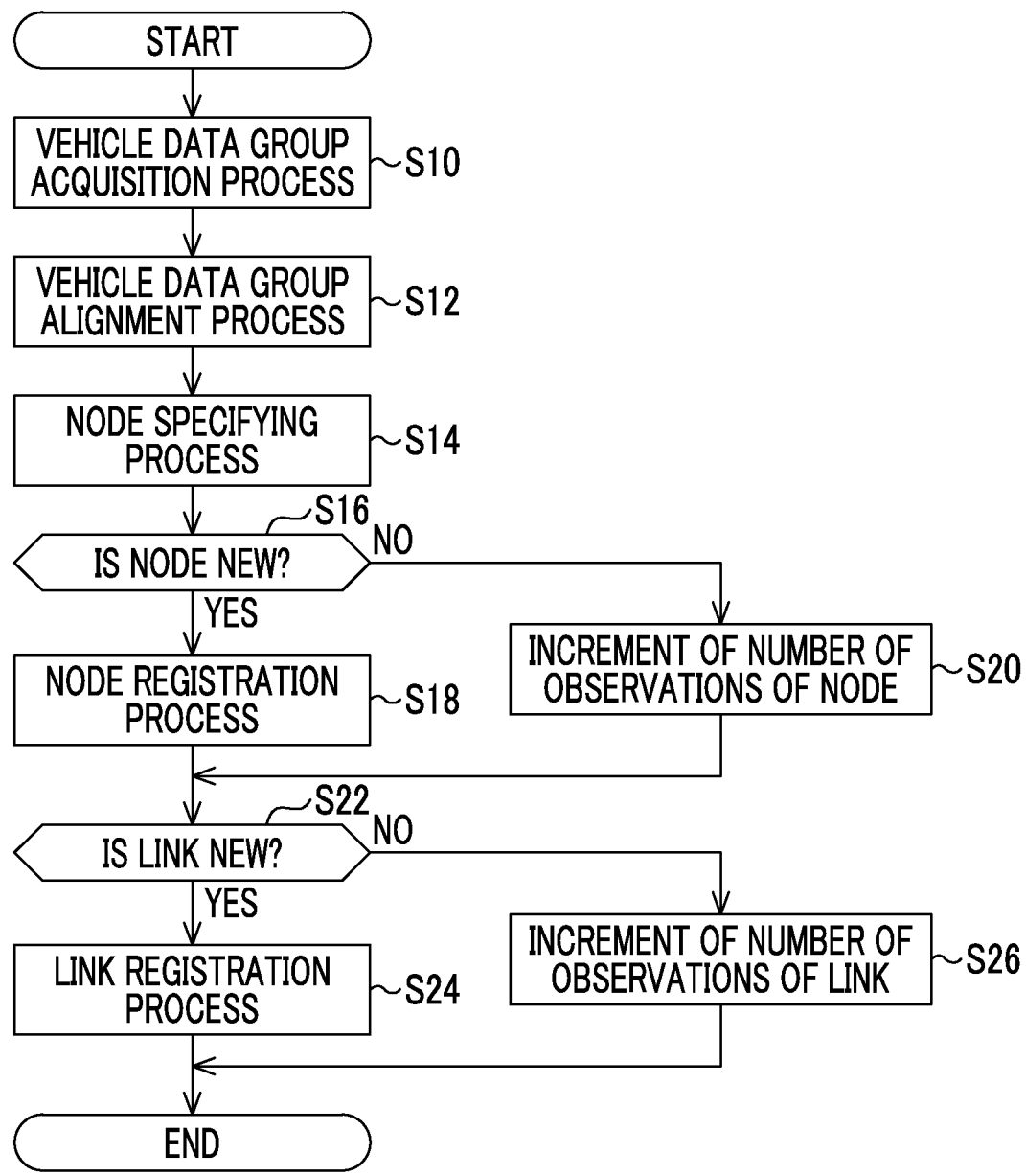
FIG. 5 is a flow diagram illustrating a procedure of a process of a list generation processing unit according to the first embodiment.

FIG. 5 illustrates a process of the list generation processing unit M42. The process illustrated in FIG. 5 is realized by the CPU 52 repeatedly executing the program stored in the ROM 54 in a predetermined period. Hereinafter, a step number is represented by a number beginning with "S".

In a series of processes illustrated in FIG. 5, the CPU 52 first collects data that is handled by the ECU 50, and acquires data that is handled by the ECU 30 and the ECU 40 over the network NW to acquire a vehicle data group for specifying the node (S10). Examples of data handled by the ECU 30 of the powertrain chassis system 20 include a vehicle speed, the amount of accelerator operation, the amount of brake operation, an outside air temperature, a state of a shift lever, a state of a changeover switch of a control mode of the transmission, a rotation angle of steering (steering angle), a state of a switch that causes a vehicle to enter a state in which the vehicle can travel, and a temperature of a refrigerant in a cooling circuit of the in-vehicle main device. The switch that causes a vehicle to enter a state in which the vehicle can travel corresponds to an ignition switch when the in-vehicle main device is an engine. Examples of data handled by the ECU 40 of the body system 22 include a state of a wiper switch, a state of an on and off switch of a light, a state of a window opening and closing switch, a detection value of an opening degree of the window, a state of a door lock device, a state of an air conditioning device, a detection value of an illuminance sensor that senses illuminance outside the vehicle 10, a detection value of a seating sensor for each seat, and a detection value of an indoor temperature of the vehicle. Data handled by the ECU 50 includes data regarding position information from the GPS 74, a state of the speaker 61, an on and off state of the voice sensing device 62, information on a display target of the image display device 63, an operation state of the touch panel 64, an on and off state of the image sensing device 65, a state of the M-system switch 66, a detection value of the sensor group 72, and an operation state of the steering switch 82.

Data according to an operation of the device in the vehicle 10 by the user is included in data identifying a node. Data indicating an operation state of the device in the vehicle 10 by the user, and data indicating a state of a device associated with the operation of the device in the vehicle 10 by the user are included in the data according to an operation of the device in the vehicle 10 by the user. Here, examples of the data indicating the operation state of the device include data regarding an accelerator operation amount, a brake operation amount, a state of a shift lever, a steering angle, a state of a switch that causes a vehicle to enter a travelable state, a state of a Winker lever switch, a state of a window opening and closing switch, and a state of the switch group 70. Further, examples of the data indicating the state of the device associated with the operation of the device in the vehicle 10 by the user include a detection value of an opening degree of the window, and a type of image that is displayed on the image display device 63, such as an image of a television broadcast or a display of map data. On the other hand, examples of data other than the data according to the operation of the device include an outside air temperature, a detection value of an illuminance sensor, and a temperature of a refrigerant in a cooling circuit.

In the embodiment, particularly, there is a plurality of types of processes of controlling the device with respect to the input operation by the user, and data regarding an input device capable of changing the correspondence relationship indicating which of the plurality of processes is selected is included in the vehicle data group for specifying a node. In the embodiment, examples of such an input device include the voice sensing device 62, the touch panel 64, the image sensing device 65, and the steering switch 82.

Next, the CPU 52 executes an alignment process for each vehicle data group acquired in the same period of time to align the vehicle data groups (S12). The alignment process is a process of grouping the vehicle data groups in an order of time series at different times T1, T2, . . . , Tm. However, for example, this does not mean that sampling is performed at a sampling timing at which all of the pieces of data constituting the vehicle data group are different between the vehicle data group at time T1 and the vehicle data group at time T2. For example, data in which a sampling period is longer than a time interval between time T1 and time T2 may be data in which the data at time T1 and the data at time T2 have been sampled in the same period of time. On the other hand, data in which the sampling period is shorter than the time interval between time T1 and time T2 is data in which the data at time T1 and the data at time T2 have been sampled at different sampling timings. However, the data constituting the vehicle data group at time T1 is data sampled at the latest sampling timing at a point in time T1. Here, although there may be data allocated at time T2 even though the data is actually sampled at a point in time T1 due to a delay or the like in the process of the in-vehicle device, the data allocated at time T2 is regarded as the latest data at a point in time T2 in the above description. In this case, the pieces of data constituting the vehicle data group at time T2 are all regarded as the pieces of data sampled in the same period of time. For example, the ECUs 30, 40 may collectively transmit sampled pieces of time-series data at different times, for example, by applying a time stamp to the time-series data that is handled by the ECU 50. In this case, the process of S10 may be a process of specifying the vehicle data group at time T1, T2, . . . , Tm depending on a time stamp. Even when the process of specifying the vehicle data group is performed, the vehicle data group at time Tm is referred to as a vehicle data group of which an acquisition timing is a time after the vehicle data group at time T1.

Referring back to FIG. 5, the CPU 52 performs a process of specifying a node that is indicated by the vehicle data group acquired at the same period of time (S14). Then, the CPU 52 determines whether the node specified through the specifying process is a new node that has not yet been specified (S16). The above-described process is a process of determining whether the same node has already been registered by referring to the node list illustrated in FIG. 3.

When the CPU 52 determines that the node is new (S16: YES), the CPU 52 applies a new node ID to the node, adds the node to the node list stored in the storage device 56, and sets the number of observations of the nodes to "1" (S18). A symbol different from that of the node ID of the node already been registered is applied to the new node. On the other hand, when the CPU 52 determines that the node is known (S16: NO), the CPU 52 increments the number of observations of the corresponding node in the node list by "1" (S20).

When the processes of S18 and S20 are completed, the CPU 52 determines whether a transition from a previously specified node to a currently specified node is new, in other word, whether a link is new (S22). The above-described process is a determination as to whether the same link has already been registered by referring to the link list illustrated in FIG. 3.

When the CPU 52 determines that the link is new (S22: YES), the CPU 52 applies a new link ID to the link, adds the link to the link list stored in the storage device 56, and sets the number of observations of the link to "1" (S24). A symbol different from the link ID of the link that has already been registered is applied to the new link.

Incidentally, when nodes specified by vehicle data groups acquired at timings continuous in time series are the same, the transition is regarded as a transition from one node to the same node, and one link ID is applied. Hereinafter, the above-described link is referred to as a self-loop.

On the other hand, when the CPU 52 determines that the link is a known link (S22: NO), the CPU 52 increments the number of observations of the corresponding link in the link list by "1" (S26). Incidentally, the processes of S16 to S26 are executed for each of the plurality of nodes is aligned in S12.

Figure 6:
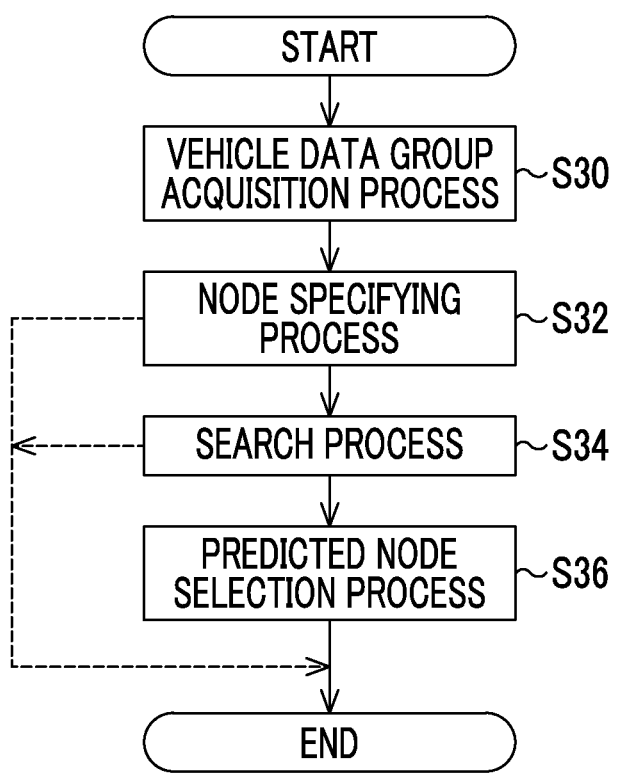
FIG. 6 is a flow diagram illustrating a procedure of a process of a transition prediction processing unit according to the first embodiment.

When the processes of S24 and S26 are completed, the CPU 52 temporarily ends the series of processes illustrated in FIG. 5. FIG. 6 illustrates a procedure of a process of the transition prediction processing unit M46. The process illustrated in FIG. 6 is realized by the CPU 52 repeatedly executing the program stored in the ROM 54 in a predetermined period.

In a series of processes illustrated in FIG. 6, the CPU 52 first acquires the vehicle data group (S30). Although the above-described process may be performed similarly to the process of S10 in FIG. 5, the process is, particularly, a process of acquiring the latest one of the vehicle data groups acquired in the same of period of time. The CPU 52 specifies the node based on the vehicle data group (S32). The CPU 52 searches for a node corresponding to the node specified in S32 from the nodes registered in the node list. In the above process, when there is no corresponding node, the series of processes illustrated in FIG. 6 are temporarily ended, as indicated by a broken line in FIG. 6.

When there is the node, the CPU 52 sets the node as a start point and searches for a path in which the process of a transition from one node to another node through the transition defined by the link list is performed a predetermined number of times (S34). Here, each transition does not include a self-loop. When the transition of the predetermined number of times cannot be defined, the CPU 52 temporarily ends the series of processes illustrated in FIG. 6, as indicated by a broken line in FIG. 6.

When the CPU 52 searches for all of the paths in which transitions from the start point node occur a predetermined number of times, the CPU 52 selects a node that is relatively highly likely to be actually generated from among candidate nodes that are nodes reached through transitions a predetermined number of times, and sets the node as an actually generated node (prediction node) (S36). In the embodiment, the CPU 52 first selects a transition in which a sum of the numbers of observations of links defining respective transitions of a predetermined number of times is maximized. Then, the CPU 52 determines whether the number of observations of the candidate node corresponding to the selected transition is equal to or greater than a threshold value. When the CPU 52 determines that the number of observations of the candidate node is equal to or greater than the threshold value, the CPU 52 sets the node as a prediction node to which the transition will occur in the future. On the other hand, when the CPU 52 determines that the number of observations of the candidate node is smaller than the threshold value, the CPU 52 selects a transition in which a sum of the numbers of observations of links defining the respective transitions of a predetermined number of times is second largest, and determines whether the number of observations of the candidate node is equal to or greater than the threshold value. When the number of observations of the candidate node is equal to or greater than the threshold value, the CPU 52 sets the node as the prediction node. Hereinafter, the above-described process is executed until there is no candidate node even though the number of observations of the candidate node is equal to or greater than the threshold value.

Figure 7:
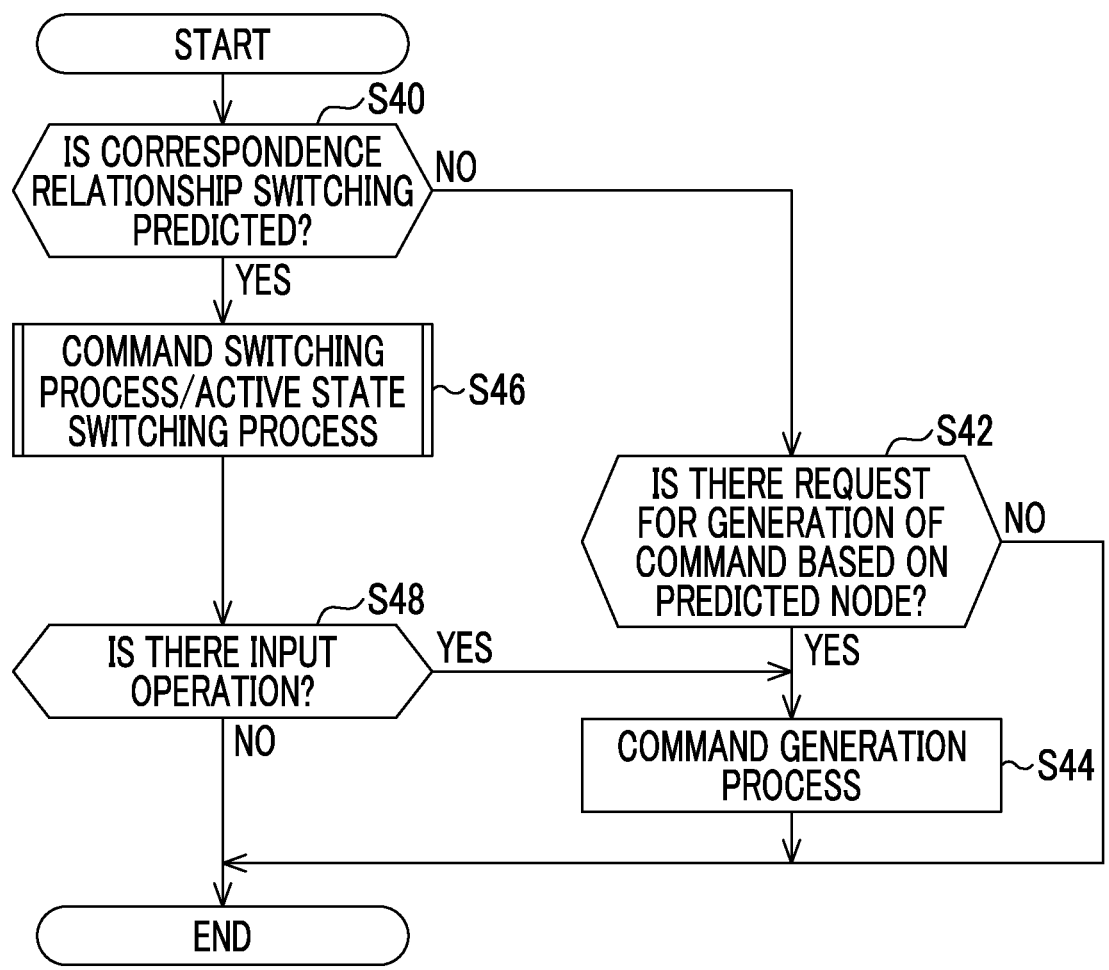
FIG. 7 is a flow diagram illustrating a procedure of a process of a command processing unit according to the first embodiment.

When there is no candidate node even though the prediction node is calculated, the CPU 52 temporarily ends the series of processes illustrated in FIG. 6. FIG. 7 illustrates a procedure of a process of the command processing unit M48. The process illustrated in FIG. 7 is realized by the CPU 52 repeatedly executing the program stored in the ROM 54 in a predetermined period.

In a series of processes illustrated in FIG. 7, the CPU 52 first predicts whether switching of a correspondence relationship between the input operation and the command occurs in the future based on the prediction node specified in S36 (S40). The CPU 52 performs the prediction according to whether a logical product of three conditions below is true. Here, a first condition is a condition that a state of a device represented by the prediction node and a state of a device represented by a current node are different from each other. A second condition is a condition that there is a plurality of types of processes of controlling a device with respect to an input operation, and an operation of the input device capable of changing a correspondence relationship regarding which of the plurality of processes is selected is predicted. A third condition is a condition that it is needed to change a currently selected association in a state of the device represented by the prediction node. Now, non-selection of any of the correspondence relationships intends a relationship different from a current correspondence relationship. Here, a case where any of the correspondence relationships is not selected refers to, for example, a case where the voice recognition engine M10 or the gesture recognition engine M20 is not started up.

When the CPU 52 determines that switching of the correspondence relationship is not predicted (S40: NO), the CPU 52 determines whether there is a request for generation of a command for controlling a vehicle-mounted device based on the prediction node (S42). In the embodiment, a list of devices that are targets of the command generation process is stored in the ROM 54 in advance. The CPU 52 assumes that there is a request for generation of a command for performing switching to a state of the device that is represented by the prediction node on condition that a current state of the device registered in the list is different from a state of the prediction node. Examples of the devices registered in the list include the speaker 61, the voice sensing device 62, the image display device 63, the touch panel 64, the image sensing device 65, the air conditioning device, the automatic window opening and closing device, the lighting device, the instrument panel, and ECUs 30, 50. For the ECUs 30, 50, a specific process being a target of the command generation process is defined in the list. Here, an example of the specific process of the ECU 30 includes a process regarding a control mode of the transmission, and examples of the specific process of the ECU 50 include a process regarding a voice recognition engine, and a process regarding a gesture recognition engine. Thus, for example, even when the state of the ECU 30 is different from the state of the prediction node, it is determined whether the difference is a target of the command generation process on condition that the above-described process corresponds to the specific process.

When the CPU 52 determines that there is a request to generate a command (S42: YES), the CPU 52 outputs a command to a device that is a generation target based on the prediction node (S44). The command generation process is illustrated herein.

For example, it is assumed that the user has a habit of getting a children on a rear seat, and sending the children to a kindergarten while displaying a video of a television broadcast on the image display device 63 by operating the M-system switch 66, and then, commuting to work while listening to a radio by operating the M-system switch in the morning on a weekday. In this case, after a seating sensor for a rear seat and a seating sensor for a driver's seat have sensed the seating, a node transitioning to a state in which the image display device 63 displays a video of the television broadcast is observed every day on a weekday. Therefore, when the user gets the child on the rear seat and sits at the driver's seat, the CPU 52 is highly likely to predict a node indicating state in which the image display device 63 displays the video of the television broadcast as a node representing a future state. In this case, even when the map is displayed on the image display device 63 on a holiday, the ECU 50 operates the image display device 63 or the speaker 61 to automatically perform mode switching to a display state of the television broadcast through the command generation process. Further, in the above-described case, since the user solely stops the vehicle for a very short time when getting the child out of the vehicle at the kindergarten, a node in which the temperature of the refrigerant in the cooling circuit of the in-vehicle main device is high to some extent, and the seating sensor senses solely seating at a driver's seat when the user starts driving the vehicle again. In this case, the television broadcast is stopped, and the number of observations of a transition to a node corresponding to a state in which a radio broadcast is output from the speaker 61 increases. When the user gets the child out of the vehicle and then causes the vehicle to enter a travelable state again, the CPU 52 stops a mode in which a video of a television broadcast is displayed on the image display device 63 based on the above, and automatically performs switching to a mode in which voice data of a radio broadcast is output from the speaker 61.

Further, for example, the set temperature of the air conditioning device that is set by an operation of a switch for adjusting the set temperature of the air conditioning device in the switch group 70 is assumed to be different when seating is sensed by the seating sensor solely on the driver's seat and when seating is also sensed by a seating sensor for a passenger seat even when a detected value of an outside air temperature sensor indicates the same temperature in hot weather in midsummer. In this case, this becomes a link in which the number of observations of a transition to a node corresponding to a case where a detection value of outside air temperature is very high, which is a node in which the set temperature of the air conditioning device is different when solely seating on the driver's seat is sensed and seating on the passenger seat is also sensed is large. Therefore, when the user puts a person in a passenger seat after riding a car by himself and going out, the CPU 52 is highly likely to predict that a node at which the temperature setting of the air conditioning device is a setting different from a current setting is a node representing a future state. When the prediction is performed, the CPU 52 generates a command to change the temperature setting through the command generation process before a temperature change operation is performed by the user, and outputs the command to the ECU 40 of the body system 22 over the network NW. Accordingly, the ECU 40 of the body system 22 operates the air conditioning device to change the temperature setting.

Further, for example, the CPU 52 can automatically execute switching from any one of a normal mode in which a rotational speed of the main device is lower than a normal speed at the same vehicle speed and a sports mode in which the rotational speed of the main device is higher than the normal speed, to the other mode according to habit of the user. That is, it is assumed that, when the user commutes to work on a weekday, for example, a normal mode is adopted, and on a holiday, a distant destination is set by the navigation system, the sports mode is adopted by operating a change-over switch of a transmission mode in the switch group 70 to drive the vehicle. In this case, a distant position is set as a destination by the navigation system, and the number of observations of a transition from a node in which the normal mode is set to a node in which a sports mode is set increases. Accordingly, when a distant position is set as a destination and a node representing a state in which the normal mode is set is specified, the CPU 52 generates a command to set the sports mode and outputs the command to the ECU 30 over the network NW. Thus, the ECU 30 changes the control of the transmission to the control corresponding to the sports mode. Further, the CPU 52 generates a command to display an indication of the sports mode on the instrument panel, and outputs the command to the ECU 40 over the network NW.

Figure 8:
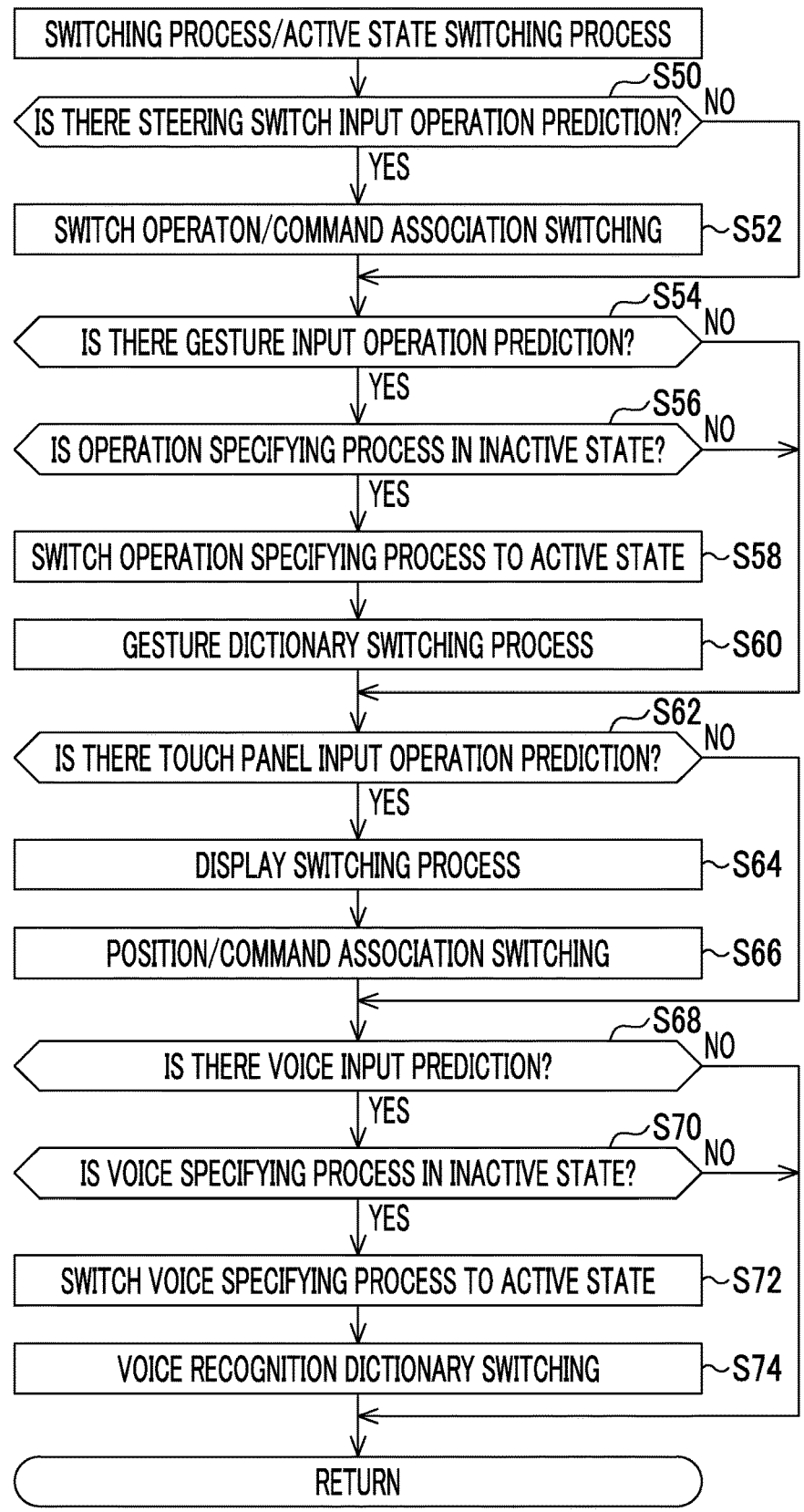
FIG. 8 is a flow diagram illustrating a subroutine of the command processing unit according to the first embodiment.

On the other hand, when the CPU 52 determines that a change in the correspondence relationship between the input operation and the command has been predicted (S40: YES), the CPU 52 executes the command switching process/the active state switching process (S46). FIG. 8 illustrates a procedure of the process of S46.

In a series of processes illustrated in FIG. 8, the CPU 52 first determines whether an input operation performed to the steering switch 82 is predicted (S50). When the CPU 52 determines that the input operation performed to the steering switch 82 is predicted (S50: YES), the CPU 52 changes the switch-command correspondence table M30 illustrated in FIG. 2C and switches the association between the operation of the steering switch 82 and the command (S52). When the process of S52 is completed or when a negative determination is made in step S50, the CPU 52 determines whether the gesture input operation performed to the image sensing device 65 is predicted (S54). When the CPU 52 determines that the gesture input operation is predicted (S54: YES), the CPU 52 determines whether an operation specifying process of specifying a gesture of the user based on the output of the image sensing device 65 is in an inactive state (S56). Here, the inactive state refers to a state in which the ECU 50 cannot recognize a predetermined operation even when the user performs the predetermined operation in front of the image sensing device 65. That is, for example, when a power supply of the image sensing device 65 is in an off state, the CPU 52 does not take output data of the image sensing device 65, or the gesture recognition engine M20 is not started up, the operation specifying process is in the inactive state. When the CPU 52 determines that the operation specifying process is in the inactive state (S56: YES), the CPU 52 switches the operation specifying process to an active state (S58). The CPU 52 may switch the gesture recognition dictionary M22 illustrated in FIG. 2B solely by regarding an operation of the device predicted by the prediction node as a command (S60).

When the process of S60 is completed or when a negative determination is made in S54 and S56, the CPU 52 determines whether n input operation performed to the touch panel 64 is predicted (S62). When the input operation performed to the touch panel 64 is predicted (S62: YES), the CPU 52 switches the image displayed on the image display device 63 to an image suitable for prediction of the input operation performed to the touch panel 64 (S64). The CPU 52 switches a relationship between a position on the touch panel 64 and a corresponding command (S66).

When the process of S66 is completed or when a negative determination is made in S62, the CPU 52 determines whether a voice input operation is predicted (S68). When the CPU 52 determines that the voice input operation is predicted (S68: YES), the CPU 52 determines whether the voice specifying process of specifying voice generated by a user based on an output of the voice sensing device 62 is in an inactive state (S70). Here, the inactive state refers to a state in which the ECU 50 cannot recognize the voice even when the user generates the voice. That is, for example, when a power supply of the voice sensing device 62 is in an off state, the CPU 52 does not receive output data of the voice sensing device 62, or the voice recognition engine M10 is not started up, the voice specifying process enters the inactive state. When the CPU 52 determines that the voice specifying process is in the inactive state (S70: YES), the CPU 52 switches the voice specifying process to an active state (S72). The CPU 52 may switch the voice recognition dictionary M12 illustrated in FIG. 2A solely by including an operation of the device predicted by the prediction node as a command (S74).

When a negative determination is made in the processes of S68 and S70 or when the process of S74 is completed, the CPU 52 illustrated in FIG. 8 temporarily ends the series of processes illustrated in FIG. 8. Referring back to FIG. 7, when the process of S46 is completed, the CPU 52 determines whether there is an input operation performed to the input device (S48). When the CPU 52 determines that there is the input operation (S48: YES), the process proceeds to S44. However, the command generation process here is a process of generating a command that is uniquely determined from the input operation based on the correspondence relationship defined in S46. The CPU 52 temporarily ends the series of processes illustrated in FIG. 7 when the process at S44 is completed or when a negative determination is made in the process S42.

An operation in the embodiment will be described herein. For example, each time there is an incoming call, the user operates the mode switch 82a to select a mode of "selection of availability of an incoming call response of a phone". Subsequently, the user operates the right selection switch 82b, the left selection switch 82c, the UP switch 82d, or the DOWN switch 82e in order to instruct a process to respond to the incoming call in the response device 67. In this case, the number of observations of the transition from the node indicating a state in which there is an incoming call of a phone to a node that selects the mode of "selection of availability of an incoming call response of a phone" increases. Therefore, when there is an incoming call of a phone, the CPU 52 is more highly likely to predict the node that selects the mode of "selection of availability of an incoming call response of a phone" through the transition prediction process. When the CPU 52 performs the prediction, the CPU 52 performs automatic switching to the mode of "selection of availability of an incoming call response of a phone" through the process of S52 even when a currently selected mode is the mode of "voice data list display". Thus, the user can respond to the incoming call solely by operating the right selection switch 82b, the left selection switch 82c, the UP switch 82d, or the DOWN switch 82e.

Further, for example, it is assumed that when the vehicle reaches a relatively noisy place such as a construction site during driving, the user of the vehicle 10 often uses the gesture recognition in order to increase volume for audio playback, but does not use the gesture recognition in order to perform an instruction to increase the set temperature of the air conditioning device during driving of the vehicle 10. In this case, a large number of transitions from a node sensing sound of which a detection value of the environmental sound sensor is great to a node instructing the volume for audio playback through the gesture recognition are observed. Accordingly, when the current node is a node sensing the sound of which the detection value of the environmental sound sensor is great, the CPU 52 is highly likely to predict the transition to the node instructing the volume for audio playback through the gesture recognition. When the CPU 52 performs the prediction, the CPU 52 performs switching to the gesture recognition dictionary M22a for audio through the process of S56 even when the gesture recognition dictionary M22b for an air conditioning device has been selected. Further, in a case where the gesture recognition engine M20 is not started up when the CPU 52 performs the prediction, the gesture recognition engine M20 is started up through the process of S60 and the gesture recognition dictionary M22a is selected.

Further, for example, it is assumed that voice recognition is often used to change a set temperature of the air conditioning device when a room temperature is higher than a set temperature or lower than the set temperature during driving of the vehicle 10 of the user, but the voice recognition is not used to issue an instruction to adjust a volume of audio playback during driving of the vehicle 10. In this case, the number of times of observation of a transition from a node indicating a state in which a detection value of the indoor temperature of the vehicle is greater than the set temperature or a state in which the detection value is smaller than the set temperature to a node that performs an operation to change the set temperature of the air conditioning device using the voice recognition increases. Therefore, when the current node is a node indicating a state in which a detection value of the indoor temperature of the vehicle is greater than the set temperature or a state in which the detection value is smaller than the set temperature, the CPU 52 is more highly likely to predict the transition to the node that performs an operation to change the set temperature of the air conditioning device using the voice recognition. Then, when the CPU 52 actually performs the prediction, the CPU 52 performs switching to the voice recognition dictionary M12b for an air conditioning device through the process of S74 even when the voice recognition dictionary M12a for audio has been selected. Further, for example, the CPU 52 starts up the voice recognition engine M10 through the process of S72 when the voice recognition engine M10 is not started up.

Further, for example, the user sets the image display device 63 to an off state not to use the touch panel 64 in a rush hour zone of the weekday morning, but usually first sets a destination using the navigation system when the user goes out with a family in the holiday. In this case, a transition from a node indicating a state in which seat sensors for a driver's seat and rear seats sense persons to a node that uses the navigation system is observed several times. Therefore, when the current node is a node indicating a state in which the seating sensor for the rear seat senses a person, the CPU 52 is highly likely to predict the node that uses the navigation system. When the CPU 52 performs the prediction, the CPU 52 displays an icon for an instruction operation with respect to the navigation system on the image display device 63 through the process of S64, and switches a correspondence relationship between an instruction position on the touch panel 64 and the command to match the icon through the process of S64.

Thus, according to the embodiment, it is possible to support the user performing an appropriate operation through a simple operation.

Second Embodiment

Hereinafter, a difference between a second embodiment and the first embodiment will be mainly described t with reference to the drawings.

Figure 9:
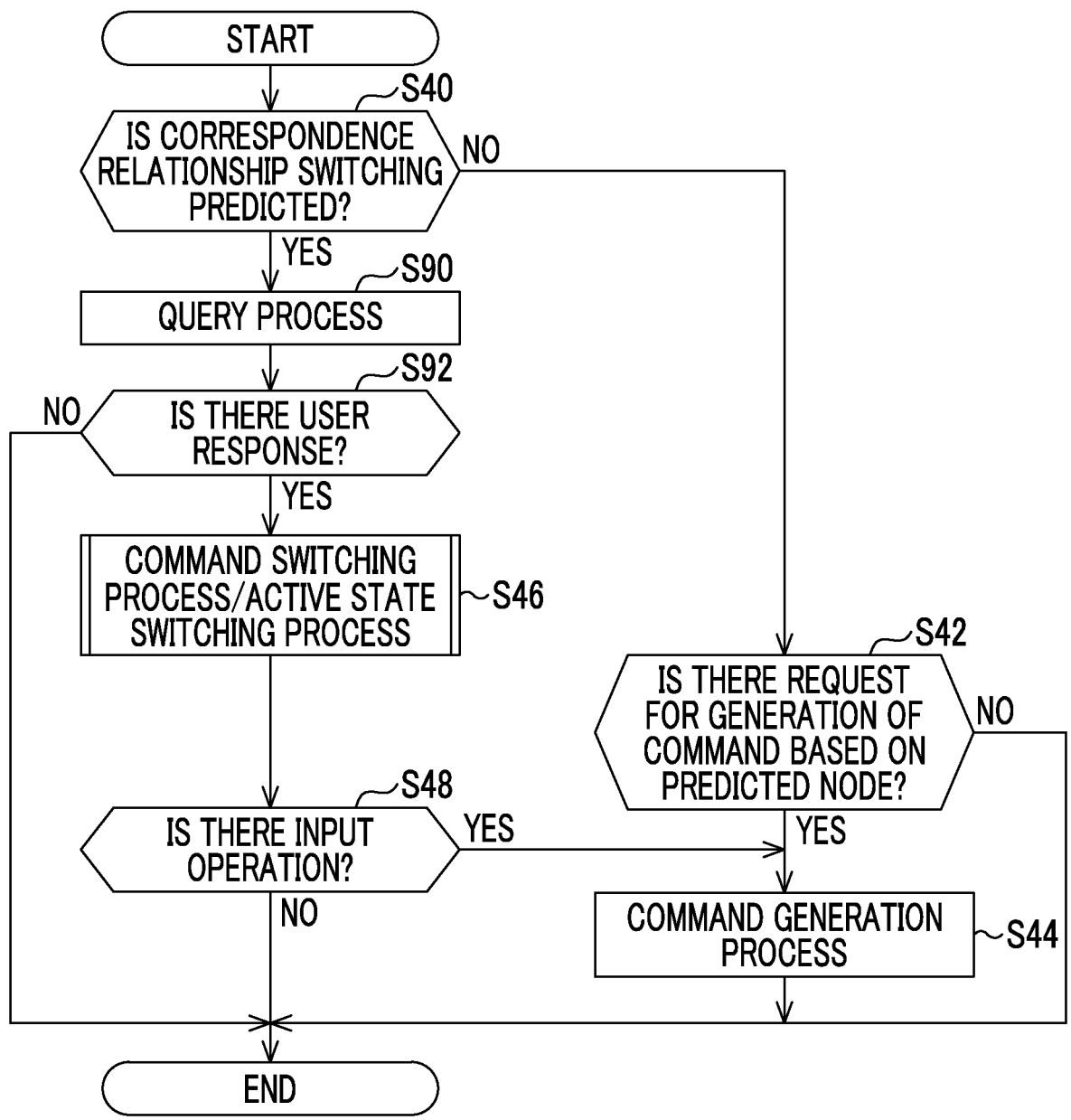
FIG. 9 is a flow diagram illustrating a procedure of a process of a command processing unit according to a second embodiment.

In the embodiment, a process of inquiring the user about whether execution of the command switching process can be performed is executed prior to executing the command switching process. FIG. 9 illustrates a procedure of a process of the command processing unit M48. The process illustrated in FIG. 9 is realized by the CPU 52 repeatedly executing the program stored in the ROM 54 in a predetermined period. In FIG. 9, processes corresponding to the processes illustrated in FIG. 7 are denoted by the same step numbers for convenience, and description thereof will be omitted.

In a series of processes illustrated in FIG. 9, when the CPU 52 performs a positive determination in the process of S40, the CPU 52 executes the command switching process to inquire the user (S90). When the user performs a permission response (S92: YES), the CPU 52 executes the process of S46, and when the user does not perform the permission response (S92: NO), the CPU 52 temporarily ends the series of processes illustrated in FIG. 9.

An operation of the embodiment will be described herein. For example, when the voice specifying process is in an inactive state, an audio signal "Would you like to start up voice recognition to switch to audio adjustment mode?" is generated from the speaker 61 prior to setting the voice specifying process to an active state to switch the voice recognition dictionary M12 to the voice recognition dictionary M12a for audio. The CPU 52 monitors the output signal of the voice sensing device 62, and starts up the voice recognition engine M10 to prepare a dictionary for audio when the user utters positive voice.

Third Embodiment

Hereinafter, a difference between a third embodiment and the second embodiment will be mainly described t with reference to the drawings.

In the embodiment, when a change from the state of the device represented by the current node to the state of the device represented by the prediction node is realized by a predetermined input operation performed by the user, an input operation for changing the state of the device is added to a predefined correspondence relationship and generated in order to increase randomness of the predetermined input operation.

Figure 10:
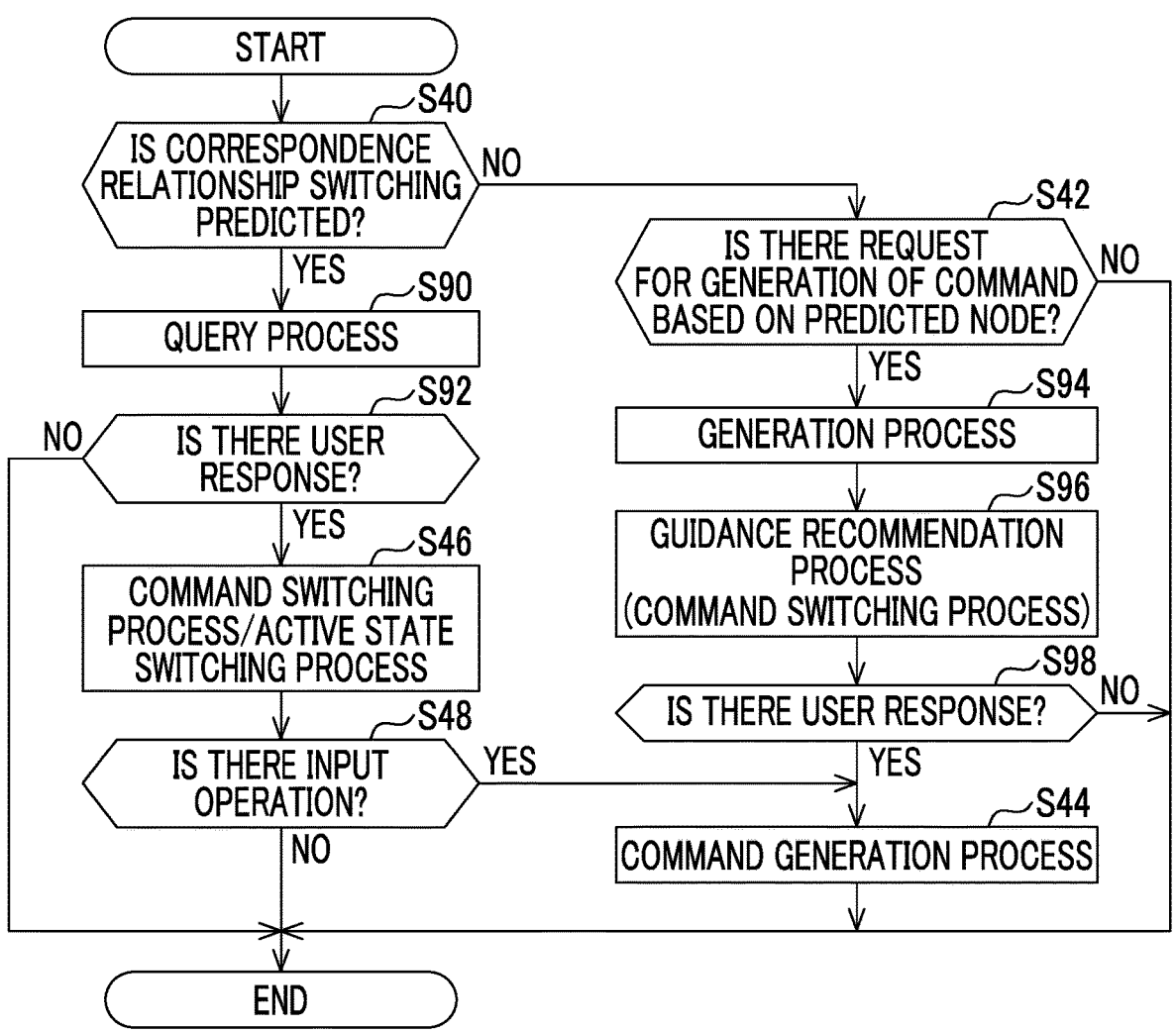
FIG. 10 is a flow diagram illustrating a procedure of a process of a command processing unit according to a third embodiment.

FIG. 10 illustrates a procedure of a process of the command processing unit M48. The process illustrated in FIG. 10 is realized by the CPU 52 repeatedly executing the program stored in the ROM 54 in a predetermined period. In FIG. 10, processes corresponding to the processes illustrated in FIG. 7 are denoted by the same step numbers for convenience, and description thereof will be omitted.

in a series of processes illustrated in FIG. 10, when the CPU 52 performs a positive determination in the process of S42, the CPU 52 generates a correspondence relationship so that the user performing a positive voice input operation with respect to a process to be described below of guiding and recommending a process of controlling a transition from the state of the device represented by the current node to the state of the device represented by the prediction node is associated with the same process (S94). The CPU 52 switches the correspondence relationship with the input voice operation to the above process, and outputs an audio signal from the speaker 61 to encourage the same process and ask permission (S96). The CPU 52 determines whether the user gives the permission (S98). When the user gives the permission (S98: YES), the process proceeds to S44 in order to generate a command for controlling a transition from the state of the device represented by the current node to the state of the device represented by the prediction node. On the other hand, when the user does not give the permission (S98: NO), the CPU 52 temporarily ends the series of processes illustrated in FIG. 10. The CPU 52 solely defines the correspondence relationship generated through the process of S94 in one process, and erases the above-described provisional relationship regardless of the presence or absence of the input operation in a predetermined period of time when the predetermined period of time elapses.

Here, an operation of the embodiment will be described. For example, when the CPU 52 predicts the user increasing the set temperature of the air conditioning device through an operation of a switch for adjusting the set temperature of the air conditioning device in the switch group 70 based on the prediction node, the CPU 52 generates an audio signal "Would you like to increase the set temperature of air conditioning device?" from the speaker 61. The CPU 52 monitors the output signal of the voice sensing device 62. When the user utters positive words, the CPU 52 outputs a command to the ECU 40 to increase the set temperature over the network NW.

Fourth Embodiment

Hereinafter, a difference between a fourth embodiment and the first embodiment will be mainly described t with reference to the drawings.

In the embodiment, a duration of the current node is predicted, and path search in the transition prediction process is executed according to the predicted duration. Therefore, in the embodiment, a cumulative observation time of each node is added to the node list as illustrated in FIG. 11A. The cumulative observation time of the node is a cumulative value of the time in which the node has been continuously observed. That is, a transition to another node occurs after certain node A is observed and, then, node A is observed again. Thus, when node A has appeared twice, the cumulative observation time is a sum of the respective durations of node A. A link list according to the embodiment illustrated in FIG. 11B is the same as that illustrated in FIG. 4B.

Figure 12:
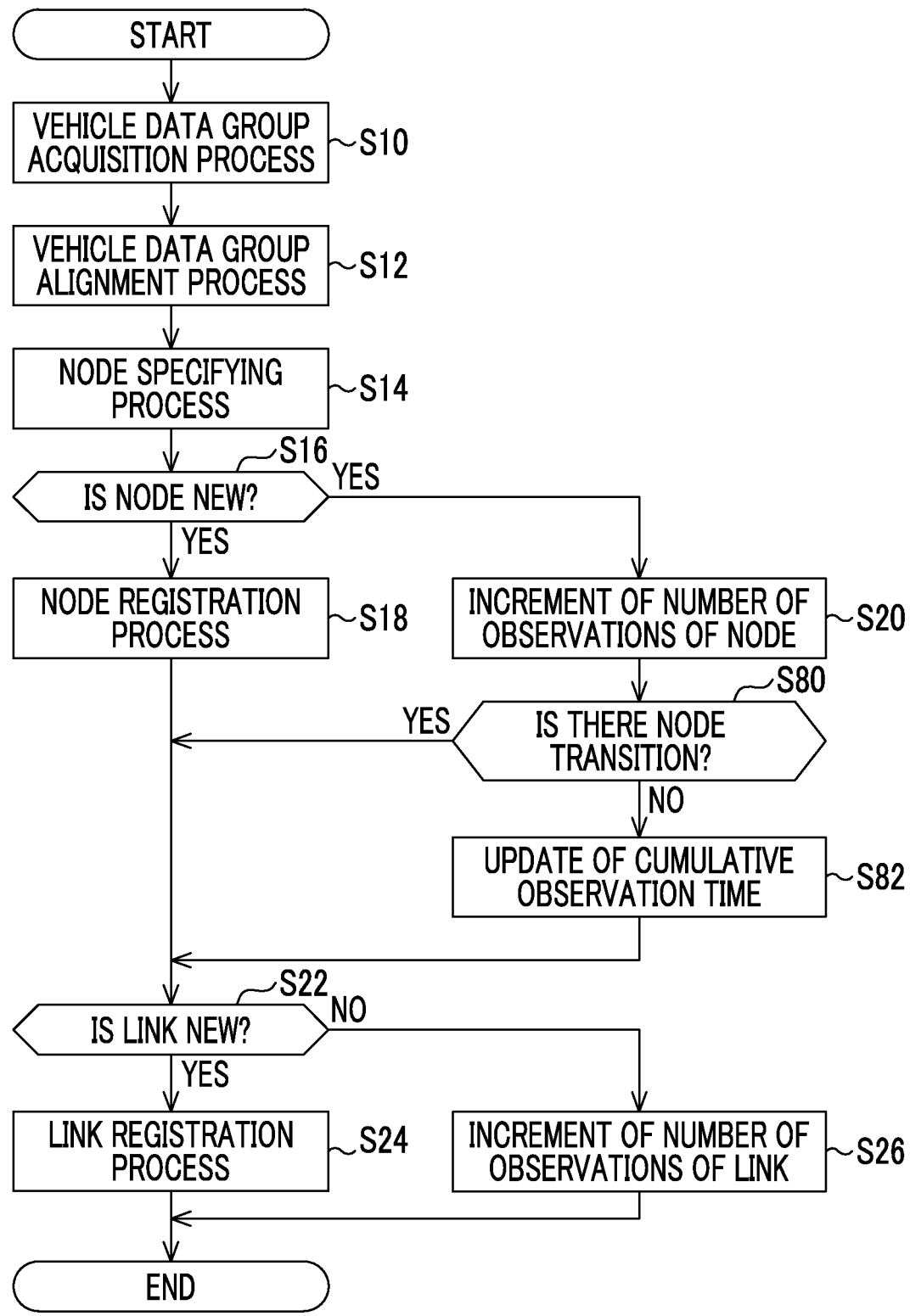
FIG. 12 is a flow diagram illustrating a procedure of a process of a list generation processing unit according to the fourth embodiment.

FIG. 12 illustrates a procedure of a process of the list generation processing unit M42. The process illustrated in FIG. 12 is realized by the CPU 52 repeatedly executing the program stored in the ROM 54 in a predetermined period. In the process illustrated in FIG. 12, processes corresponding to the processes illustrated in FIG. 5 are denoted by the same step numbers for convenience, and description thereof will be omitted.

In a series of processes illustrated in FIG. 12, when the CPU 52 increments the number of observations of the nodes (S20), the CPU 52 determines whether the node specified through the process of S14 in a previous control period and the node specified through the process of S14 in a current control period are the same (whether there is a transition) (S80). When the CPU 52 determines that there is no transition to another node (S80: NO), the CPU 52 updates the cumulative observation time (S82). That is, the CPU 52 performs correction to increase the cumulative observation time by an acquisition period of the vehicle data group. Here, the acquisition period of the vehicle data group is not a period of the process in FIG. 12, and is a time difference between acquisition timings of pieces of time-series data adjacent in time series among the pieces of time-series data of the vehicle data groups acquired in the same period of time.

Further, when the CPU 52 completes the process of S82 or when the CPU 52 performs a positive determination in S80, the process proceeds to S22. Incidentally, in addition to the processes of S16 to S26, the processes of S80 and S82 are also appropriately executed for each of the plurality of nodes aligned in S12.

Figure 13:
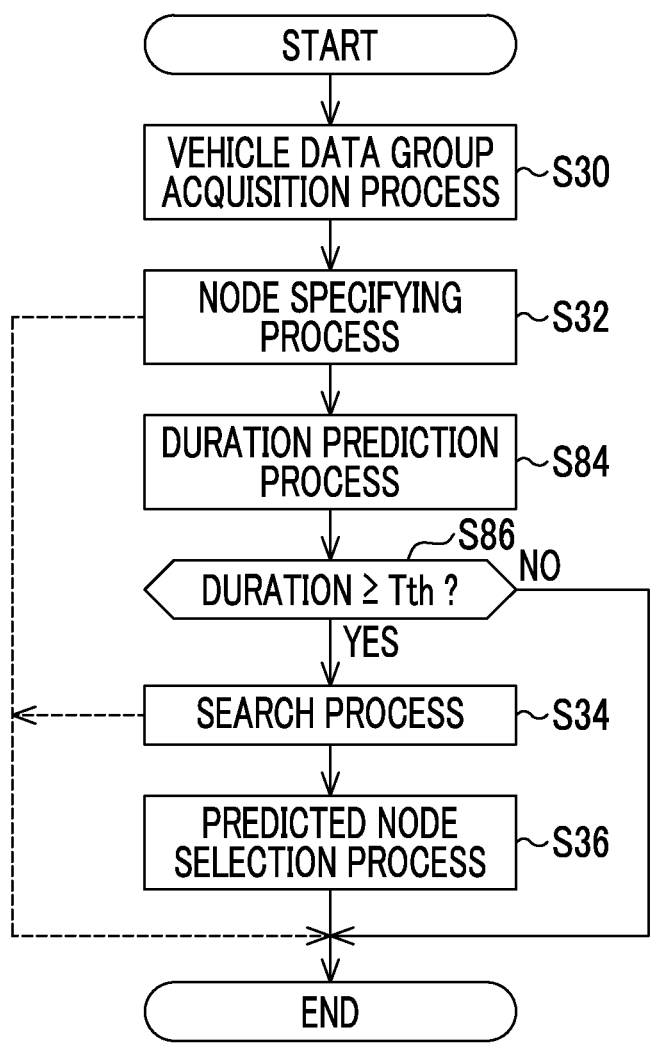
FIG. 13 is a flow diagram illustrating a procedure of a process of a transition prediction processing unit according to the fourth embodiment.

FIG. 13 illustrates a procedure of a process of the transition prediction processing unit M46. The process illustrated in FIG. 13 is realized by the CPU 52 repeatedly executing the program stored in the ROM 54 in a predetermined period. In FIG. 13, processes corresponding to the processes illustrated in FIG. 6 are denoted by the same step numbers for convenience, and description thereof will be omitted.

In a series of processes illustrated in FIG. 13, when the CPU 52 specifies the node (S32), the CPU 52 predicts a duration that is a period of time in which the node continues (S84). Specifically, the CPU 52 predicts, as the duration, a value obtained by dividing the cumulative observation time by a subtraction value obtained by subtracting a value obtained by dividing the cumulative observation time by the acquisition period of the vehicle data group from the number of observations. Here, the subtraction value is regarded as the number of appearances of the node. The CPU 52 determines whether the duration is equal to or greater than a threshold time Tth (S86). The above-described process is for determining whether a path search process or a prediction node selection process is executed. That is, the path search process or the prediction node selection process takes a certain amount of time, and accordingly, when the duration of the current node is relatively shorter, an actual node has already transitioned at a point in time at which the prediction node is determined, and the prediction node is unlikely to be appropriately predicted. The threshold time Tth is set to a time sufficient to execute the path search process or the prediction node selection process and execute the subsequent command generation process.

When the CPU 52 determines that the duration is equal to or greater than the threshold time Tth, the process proceeds to the process of S34, and when the CPU 52 determines that the duration is smaller than the threshold time Tth (S86: NO), the CPU 52 temporarily ends the series of processes illustrated in FIG. 13.

Thus, according to the embodiment, since the transition prediction process is not executed when the predicted value of the duration of the current node is smaller than the threshold time Tth, it is possible to suppress occurrence of a situation that a change has already occurred after the node is determined to be a start point node through the transition prediction process when the command is generated through the command generation process.

Fifth Embodiment

Hereinafter, a difference between a fifth embodiment and the fourth embodiment will be mainly described t with reference to the drawings.

In the fourth embodiment, the CPU 52 determines whether the path search process or the prediction node selection process is executed based on the predicted value of the duration of the current node, whereas in the present embodiment, the conditions of the path search process are variably set based on the predicted value.

Figure 14:
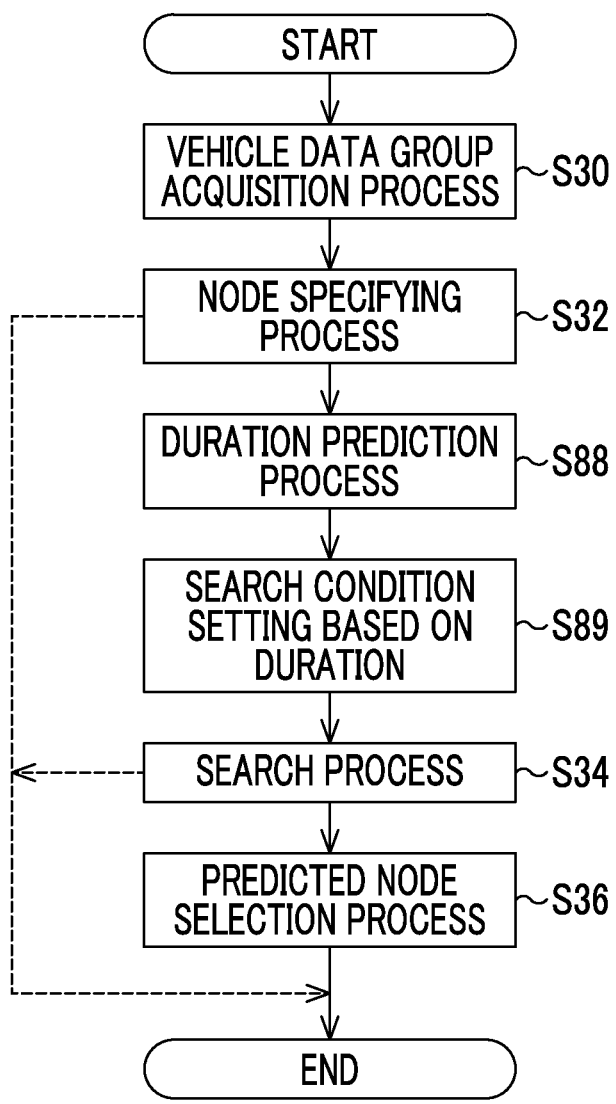
FIG. 14 is a flow diagram illustrating a procedure of a process of a transition prediction processing unit according to a fifth embodiment.

FIG. 14 illustrates a procedure of a process of the transition prediction processing unit M46. The process illustrated in FIG. 14 is realized by the CPU 52 repeatedly executing the program stored in the ROM 54 in a predetermined period. In FIG. 14, processes corresponding to the processes illustrated in FIG. 13 are denoted by the same step numbers for convenience, and description thereof will be omitted.

In a series of processes illustrated in FIG. 14, when the CPU 52 predicts a duration (S88), the CPU 52 sets a search condition based on the duration (S89). Specifically, the CPU 52 increases the number of transitions of paths for search from a current node as the duration increases. The CPU 52 searches for paths in a case where the transition occurs from the current node by the set number of transitions (S34).

According to the embodiment, when the predicted duration of the current node is relatively shorter, it is possible to reduce a calculation load of the CPU 52 and shorten a time required for the transition prediction process by reducing the number of transitions of the path to be searched for in the transition prediction process. Thus, it is possible to suppress a change after the current node is determined to be a start point node through the transition prediction process at a point in time at which the command is generated based on the prediction node.

Sixth Embodiment

Hereinafter, a difference between a sixth embodiment and the first embodiment will be mainly described t with reference to the drawings.

Figure 15:
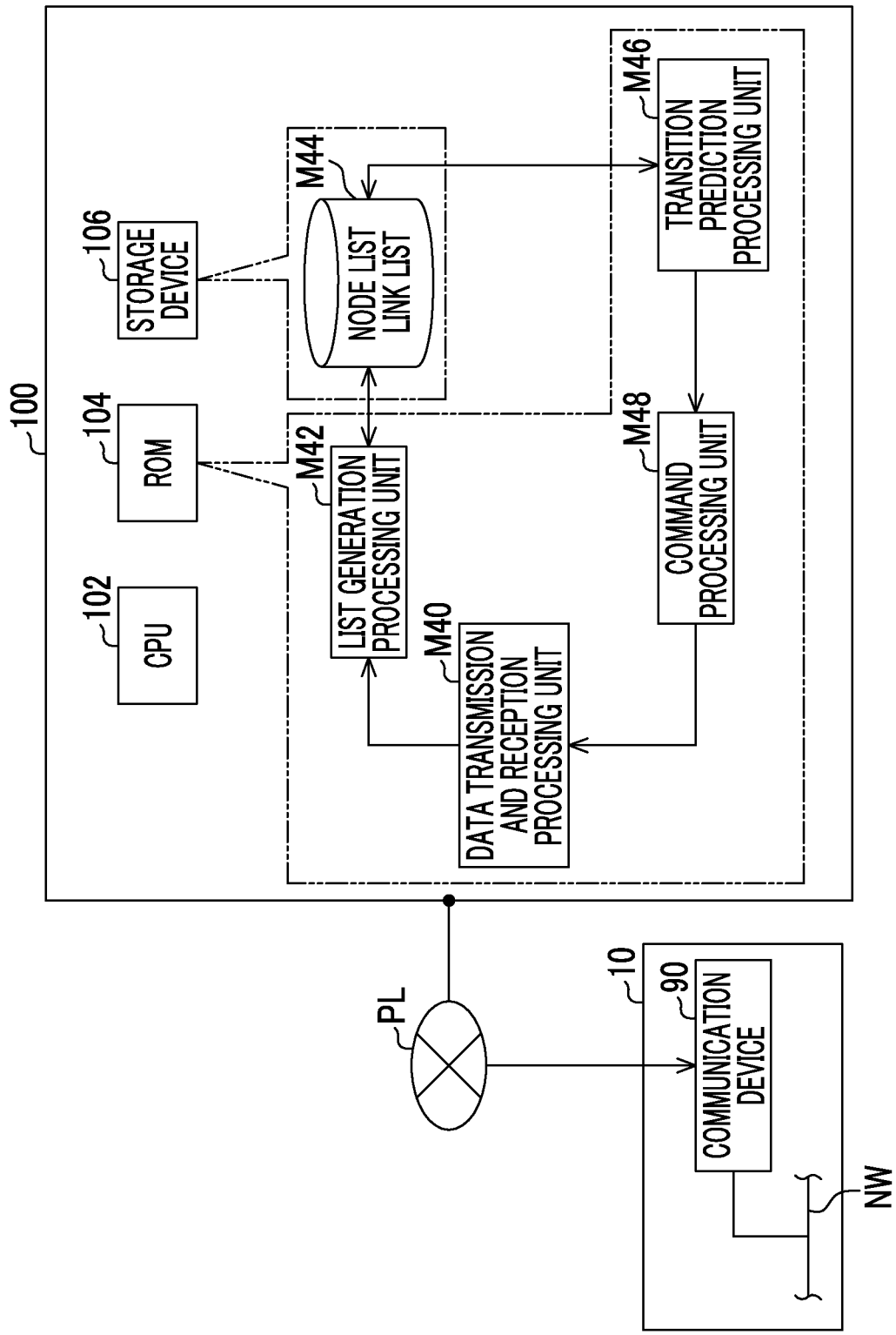
FIG. 15 is a diagram illustrating a process of an ECU that communicates with a vehicle according to a sixth embodiment.

In the embodiment, the process illustrated in FIG. 3 is executed by a device outside the vehicle 10. That is, as illustrated in FIG. 15, the vehicle 10 includes a communication device 90 capable of communicating with a public line network PL, and communicates with an ECU 100 of a center that collects a vehicle data group from a plurality of vehicles 10 via the communication device 90.

The ECU 100 includes a CPU 102, a ROM 104, and a storage device 106. The storage device 106 is an electrically rewritable nonvolatile storage device. A program for causing the CPU 102 to function as the data transmission and reception processing unit M40, the list generation processing unit M42, the transition prediction processing unit M46, and the command processing unit M48 is stored in the ROM 104. Further, the voice recognition dictionary M12, the gesture recognition dictionary M22, and the switch-command correspondence table M30 are stored in the ROM 104. On the other hand, the node list and the link list are stored in the storage device 106.

Accordingly, the CPU 102 generates the node list and the link list based on the vehicle data group transmitted from the vehicle 10 and generates a command to predict the transition of the nodes based on the node list and the link list. The CPU 102 transmits the generated commands to the vehicle 10. The node list and the link list may be separate lists for each vehicle 10. This can be realized by transmitting a vehicle ID when the vehicle data group is transmitted from the vehicle 10.

Correspondence Relationship

The input device corresponds to the steering switch 82, the voice sensing device 62, the touch panel 64, and the image sensing device 65. The vehicle control device corresponds to the ECU 50 in FIG. 1, and corresponds to the ECU 100 in FIG. 15. The transition prediction process corresponds to the process of FIG. 6, the command switching process corresponds to the processes of S50, S52, S54, S60, S62, S66, S68, and S74, and the command generation process corresponds to the process of S44. The active state switching process corresponds to the processes of S70 and S72. The active state switching process corresponds to the processes of S56 and S58. This corresponds to the process of S94 in FIG. 10. This corresponds to the process of S96 in FIG. 10. The permission process corresponds to the process of S86, and the limiting process corresponds to the process of S89.

Other Embodiments

At least one of the respective matters of the present embodiment may be modified as follows.

Setting of Threshold Time Tth

The fact that the execution condition of the transition prediction process is that the predicted duration of the current node is equal to or greater than the threshold time Tth is not limited to the case of the fourth embodiment. For example, a process in which the result of the transition prediction process is used may be the process of FIG. 9 or 10. In this case, when the threshold time Tth is set to an approximate average value assumed as, for example, a signal waiting time according to the setting of the threshold time Tth, it is possible to suppress voice guidance or the like to the user through the query process or the guidance recommendation process at the time of signal waiting.

Restriction Process

In the process of S89 in FIG. 14, the number of transitions to the end point node when the predicted duration is relatively shorter is smaller than that when the predicted duration is relatively longer, but the present disclosure is not limited thereto. For example, the search process may be a process of searching for the next transition on condition that the above-described number of observations is equal to or greater than the lower limit, for a node appearing during the transition, and stopping the path search when the number of observations is smaller than the lower limit, and in the limiting process, when the predicted duration is relatively shorter, the lower limit value may be set as a greater value than that when the predicted duration is relatively longer.

Transition Prediction Process

The transition prediction process of setting the current node as a start point node and predicting another node that is a transition destination from the start point node is not limited to the process exemplified in the embodiment. For example, a candidate node at which the number of observations of the links is maximized among the candidate nodes reached through a predetermined number of times of transitions may be predicted as a transition destination according to the transition defined by the link list from the start point node without reference to the number of observations of the nodes. Thus, when the number of observations of the nodes is not used, the number of observations of the nodes may not be included in the predicted data.

Further, for example, a candidate node at which an average value of the numbers of observations of transitions per one time is maximized among the candidate nodes reached through the transition by respective times from one time to a predetermined plurality of times may be predicted as the transition destination according to the transition defined by the link list from the start point node. Here, the average value of the numbers of observations of transitions is a value obtained by dividing a sum of the numbers of observations of respective links defining the transition from the start point node to the candidate node by the number of transitions. For example, when a pair of candidate nodes having the same average value is generated, the candidate node for which the number of observations of the candidate nodes is relatively larger may be determined as a prediction node that is the transition destination.

The transition prediction process is not limited to the use of the number of observations of the links. For example, the node at which an average value of the numbers of observations of each node from the node next to the start point node to the end point node is maximized among the nodes reached through the transition by the number of times from one time to a predetermined plurality of times may be predicted as the node that is a transition destination according to the transition defined by the link list from the start point node. This is a process that is regarded as a case that is easily generated when the vehicle passes through a node of which the number of observations is relatively larger, as compared with when the vehicle passes through a node of which the number of observations is relatively smaller. Thus, when the number of observations of the links is not used, the number of observations of links may not be included in the prediction data.

Further, the transition prediction process may include, for example, a process of setting a node that can be a target of a command generation process, which is a node different from a current node, as the candidate node, in advance. This is realized, for example, by determining the prediction node by excluding nodes that cannot reach the current node from the candidate node while conversely following the transitions defined in the link list, and nodes that become other candidate nodes midway, and then, specifying a node of which the average number of observations of links is maximized.

Command Generation Process

In the embodiment, the device that is a target of the command generation process has been set in advance, and the command for performing control for the state represented by the prediction node has been generated on condition that a state of the set device is different between the current state and the state that is represented by the prediction node, but the present disclosure is not limited thereto. For example, a device that is not a target of the command generation process may be set in advance, and a command for performing control for the state represented by the prediction node may be generated on condition that a current state of the device that is not set is different from the state that is represented by the prediction node.

However, for example, when data of a device is not desired to be the target of the command generation process is not included in data constituting the node, the device that is the target of the command generation process or the device that is not the target of the command generation process may not be determined in a list in advance.

Input Device

An input device with a plurality of correspondence relationships between the input operation and a type of process of controlling the device is not limited to the input device exemplified in the embodiment. For example, the input device may be the M-system switch 66 or may be the steering 80, for example, when an automatic steering process is performed.

Generation Process

In the process illustrated in FIG. 10, the input operation for which the correspondence relationship is added is solely the voice input operation, but the present disclosure is not limited thereto. For example, the steering switch 82 may be used. Further, for example, the touch panel 64 may be used.

Guidance Recommendation Process

In the embodiment, the input device for a user authorization response to a guidance recommendation process is the voice sensing device 62, but the present disclosure is not limited thereto. For example, the input device may be the touch panel 64, the image sensing device 65, or the steering switch 82.

In the embodiment, the guidance recommendation process has been executed by the audio signal, but the present disclosure is not limited thereto. For example, the guidance recommendation process may be executed by displaying visual information of guidance content as a virtual image on the front of a windshield using a head-up display.

The guidance recommendation process is not indispensable. For example, the image display device 63 may be blinked in red at the time of an incoming call, and an incoming call of a phone response process may be performed according to a user's touch input operation on the touch panel 64.

Query Process

In the process illustrated in FIG. 10, the processes of S90 and S92 may be deleted. Accordingly, a frequency of user interaction according to a voice guidance or the like is reduced. That is, in this case, when the input device usually used for an input operation by the user corresponds to a plurality of commands, it is possible to simply perform the input operation performed to the input device by automatically performing the association with a command intended by the user. Further, for an operation of a device using any other input device, it is possible to perform an input operation of an authorization response to a guidance encouraging process.

Command Switching Process

For example, a condition that "there is a plurality of types of processes of controlling a device with respect to an input operation, and an operation of the input device capable of changing a correspondence relationship regarding which of the plurality of processes is selected is predicted" that is the second condition in the process of S40 in FIG. 7 may be changed as follows. That is, the condition may be changed to "a change from a state represented by the current node to a state represented by the prediction node can be performed by an input device in which there is a plurality of types of processes of controlling a device with respect to the input operation".

Data Group

The data group is not limited to a data group including solely the vehicle data group and may include, for example, a house data group that is a plurality of types of data associated with a house-based device of the user of the vehicle. Further, for example, the data group may include data regarding information on a road on which the vehicle 10 travels, or the like, data regarding a time zone, or a data group for specifying a node.

Vehicle Control Device

The vehicle control device is not limited to a vehicle control device that includes a CPU and a program storage device such as a ROM and executes a software process. For example, a dedicated hardware circuit (for example, an ASIC) that performs a hardware process on at least some of software processes in the embodiment may be included. That is, the vehicle control device may have any one of the following configurations (a) to (c). (a) A software processing circuit including a processing device that executes all of the processes according to a program, and a program storage device that stores the program is included. (b) A software processing circuit that executes some of the processes, and a dedicated hardware circuit that executes the remaining processes are included. (c) A dedicated hardware circuit that executes all of the processes is included. Here, there is a plurality of software processing devices or a plurality of dedicated hardware circuits. That is, each process may be executed using a processing circuit including at least one of one or a plurality of software processing circuits and one or a plurality of dedicated hardware circuits.

Others

The control device in the vehicle 10 is not limited to that illustrated in FIG. 1. For example, a control device that performs a process for traveling safety may be separately included. Further, for example, the ECU 30 of the powertrain chassis system 20 may be divided into an ECU of the powertrain chassis system 20, an ECU of a steering system, and other ECUs.

For example, when the process of S10 in FIG. 5 is the process of acquiring the vehicle data group once, the process S12 may be deleted.

What is claimed is:

1. A vehicle control device comprising
an electronic control unit configured to:
receive an input from an input device, the input being configured to be applied to a plurality of distinct processes to generate a plurality of distinct outputs, each distinct process being performed by a respective output device;
predict a prediction node, when the electronic control unit receives the input, for a vehicle, wherein the prediction node is predicted by
defining a node of a directed graph based on a vehicle data group containing multiple types of data,
selecting a node corresponding to the node of the directed graph from a node list,
searching candidate nodes with the selected node as a starting point from all paths of transitioning from one node to another node in a link list, and
determining one candidate node whose total number of times of observations that define a predetermined number of transitions is greater than or equal to a threshold value among the candidate nodes
select one of the plurality of distinct processes based on the prediction node; and
generate a command to be transmitted to an output device associated with the selected distinct process, the command being configured to cause the output device to perform the selected distinct process to generate an output based on the input, wherein
the output device in the vehicle includes a response device that is configured to respond to an incoming phone call, and
an electronic control device is configured to select responding to the incoming phone call by the response device when the prediction node is a node representing responding to the incoming phone call.

2. The vehicle control device according to claim 1, wherein:
the input device includes a steering switch provided on a steering of the vehicle;
the electronic control device is configured to associate the steering switch with the selected responding to the incoming phone call when the prediction node is a node representing responding to the incoming phone call.

3. The vehicle control device according to claim 1, wherein:
the input device is a voice sensing device; and
the electronic control device is configured to select the selected process based on an output of the voice sensing device.

4. The vehicle control device according to claim 3, wherein the electronic control unit is configured to activate the selected process if the selected process is inactive when the prediction node is a node representing execution of the selected process.

5. The vehicle control device according to claim 1, wherein:
the input device includes an image sensing device that senses an image in the vehicle; and
the electronic control device is configured to select the selected process based on an output of the image sensing device.

6. The vehicle control device according to claim 5, wherein the electronic control unit is configured to activate the selected process if the selected process is inactive when the prediction node is a node representing execution of the selected process.

7. The vehicle control device according to claim 1, wherein:
the vehicle includes an image display device and the input device includes a touch panel overlapping the image display device;
the electronic control device is configured to select the selected process based on a position of a finger on the touch panel of the display device; and
the selected process is configured to display an image on the image display device.

8. The vehicle control device according to claim 1, wherein the electronic control unit is configured to generate a new correspondence relationship based on the prediction node.

9. The vehicle control device according to claim 8, wherein:
the electronic control unit is configured to request permission of the user when selecting one of the plurality of distinct processes based on the prediction node.

10. The vehicle control device according to claim 1, wherein:
the data for prediction includes data regarding an average value of a duration of the node; and
the electronic control unit is configured to:
predict a duration of the current node based on the current node and the data regarding the average value, and
execute at least one of:
a permission process of determining whether the duration predicted through the duration prediction process is equal to or longer than a threshold time and predicting prediction node when the duration is equal to or longer than the threshold time, and
a limiting process of limiting the number of the prediction nodes when the duration is relatively shorter to a smaller value than that when the duration is relatively longer.

11. The vehicle control device according to claim 1, wherein the node list is data in which a node ID is assigned to a node that is specified by a vehicle data group that is a plurality of types of pieces of data regarding devices in the vehicle, and the number of observations of the nodes has been recorded.

12. The vehicle control device according to claim 1, wherein the link list is data in which a node ID before the transition is defined as a start point node ID, a node ID after the transition is defined as an end point node ID, and the number of observations of the links has been recorded.

* * * * *